US005675938A

United States Patent [19]

McLorg

[11] Patent Number: 5,675,938
[45] Date of Patent: Oct. 14, 1997

[54] DESERT ENVITALIZATION SYSTEM WITH VARIABLE VOLUME PNEUMATIC POLYDOME ENCLOSURE

[75] Inventor: Anthony Barr McLorg, Mantua, Ohio

[73] Assignee: Fabric Enclosures, Inc., Lexington, Ky.

[21] Appl. No.: 636,351

[22] Filed: Apr. 23, 1996

[51] Int. Cl.[6] ............ E04H 15/22; E04G 11/04; E04B 1/32
[52] U.S. Cl. ............ 52/2.26; 52/2.11; 52/2.24; 52/81.1; 47/27; 47/29; 47/32.1
[58] Field of Search .................. 52/2.18, 2.24, 52/2.26, 81.1, 2.11; 47/32.1, 29, 27, 58 EC

[56] References Cited

U.S. PATENT DOCUMENTS

| | | | |
|---|---|---|---|
| 3,924,363 | 12/1975 | Candle | 52/2.24 X |
| 4,718,130 | 1/1988 | Steinback | 52/2.18 X |
| 4,741,123 | 5/1988 | Gauthier | 47/27 |
| 4,805,355 | 2/1989 | Plant | 52/2.18 X |
| 5,279,081 | 1/1994 | Dempster | 52/2.26 X |

*Primary Examiner*—Christopher T. Kent
*Attorney, Agent, or Firm*—Shlesinger Arkwright & Garvey, LLP

[57] ABSTRACT

A variable volume pneumatic enclosure is provided. The enclosure includes a combination of fixed and ballast anchors for allowing the enclosure to expand and contract in order that a complete hydrologic cycle may be closed. The enclosure also includes a collection system for collecting condensed water vapor within the enclosure and a distribution system for redistributing the collected water.

28 Claims, 20 Drawing Sheets

SUMMER CYCLE

NOMINAL SUMMER CYCLE

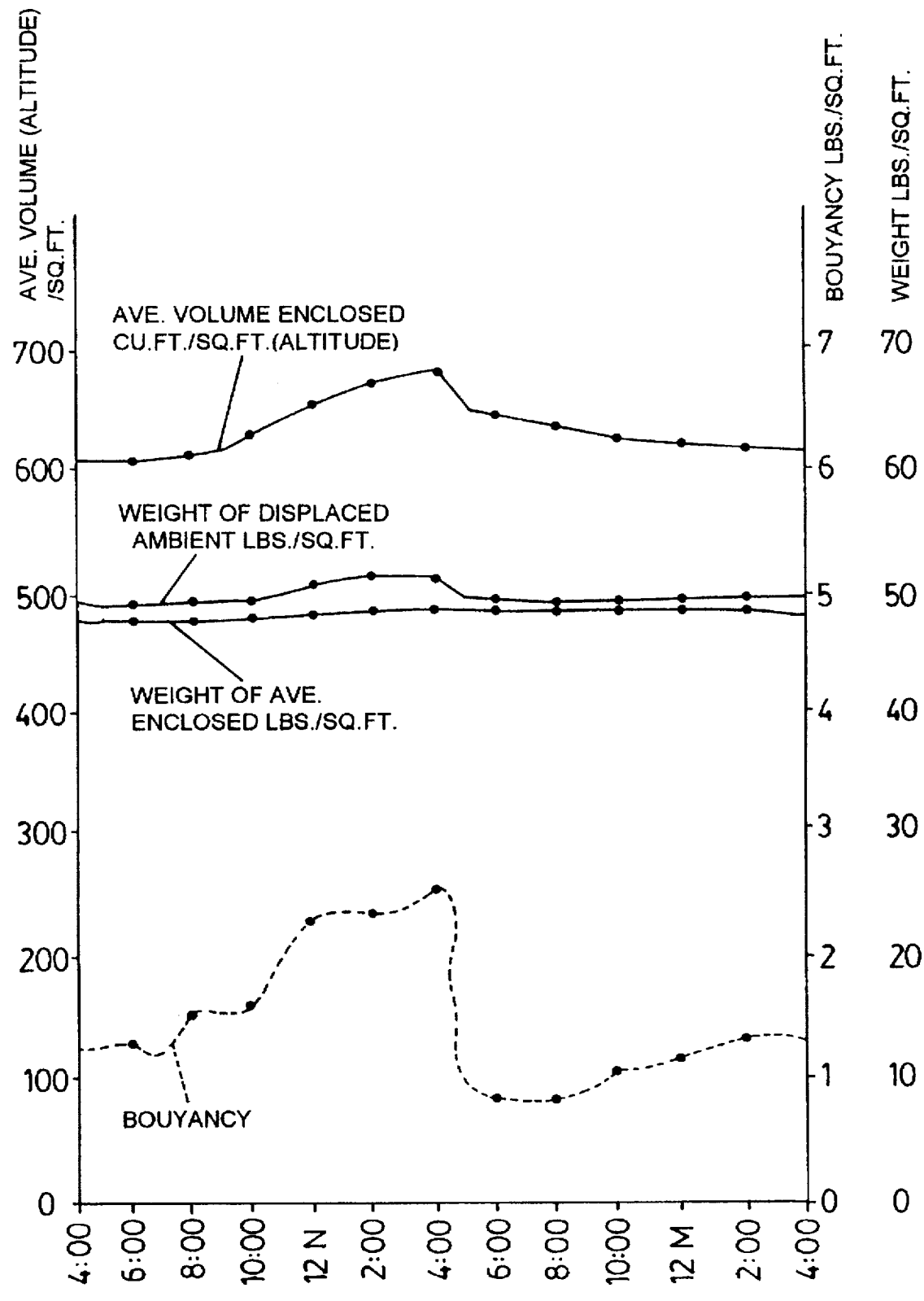
FIG. 7A — WINTER CYCLE

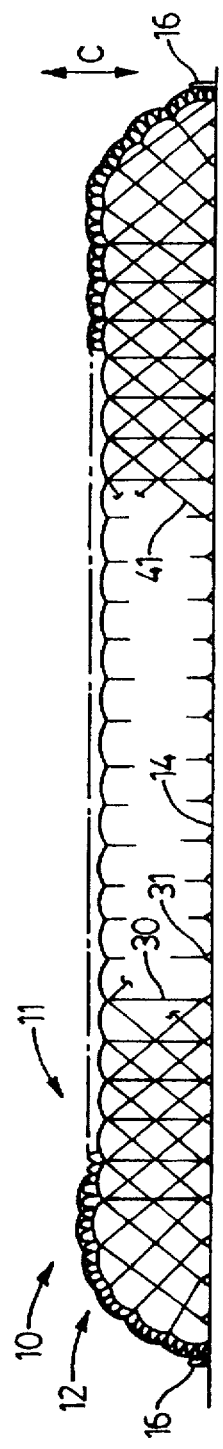
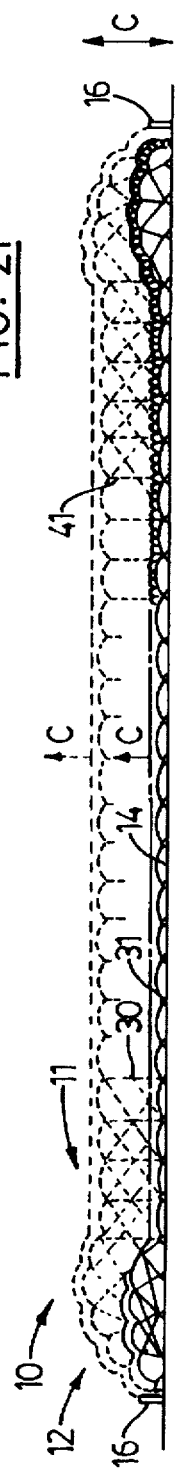
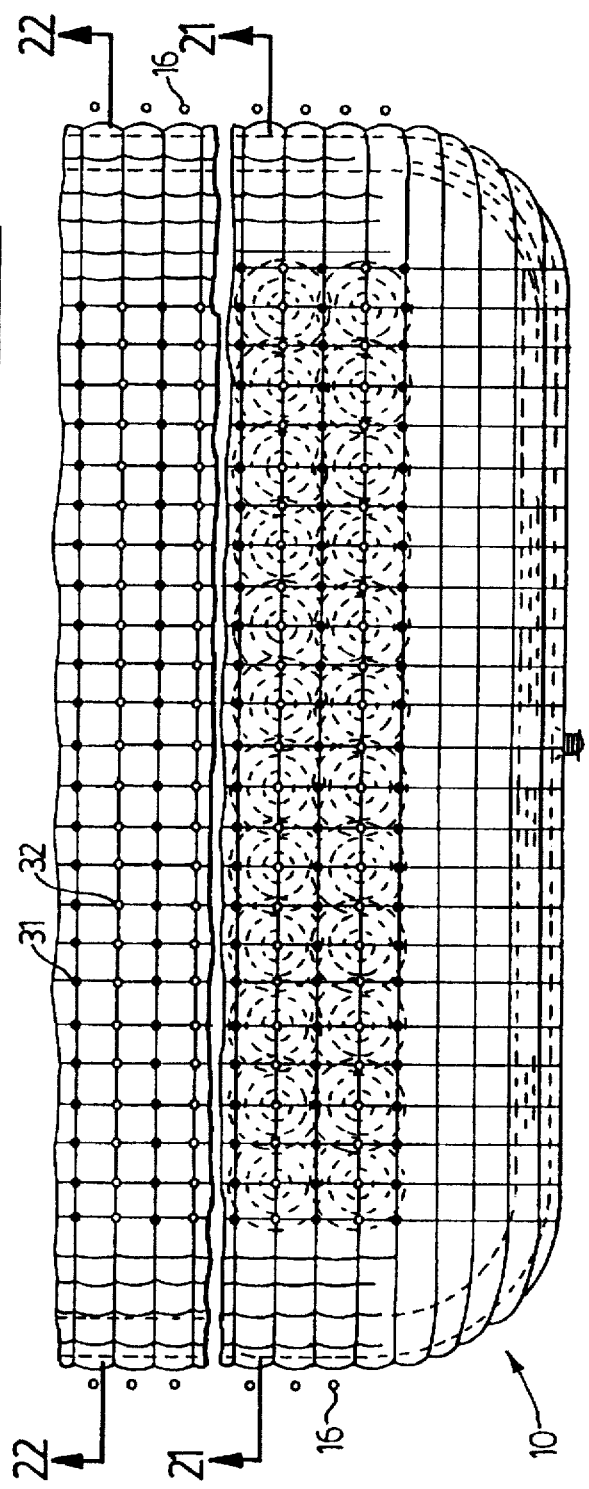

DESERT ENVITALIZATION SYSTEM WITH VARIABLE VOLUME PNEUMATIC POLYDOME ENCLOSURE

FIELD OF THE INVENTION

The present invention relates to a pneumatic enclosure and specifically a translucent variable volume pneumatic enclosure which absorbs solar energy and substantially closes the hydrologic cycle to capture and convert water vapor therein for ongoing irrigation and electrical generation.

BACKGROUND OF THE INVENTION

The flux of vapor from the oceans to the continents through the atmosphere and its ultimate return to atmosphere or ocean by evaporation, transportation, condensation and run-off is known as the hydrologic cycle (or hydrocycle). Precipitation occurs when the air is cooled to saturation. The ascent of warm, humid air into the lower pressure of the upper atmosphere is the most effective process for causing rapid cooling and condensation.

Water is essential for all living things. Its adequate supply is a key factor for urban, agricultural and industrial development. However, because of its remarkable solvent properties, water can also be the recipient of pollutants which degrade its quality for all uses. The raising of ground water for irrigation of agricultural lands may cause deterioration of the soils and loss of fertility by silting, water logging and especially increased salinity. Erosion of soil by flowing waters and ultimate deposition of the sediment in lakes, reservoirs, stream channels and harbors are also serious problems associated with irrigation systems of the prior art. Thus, the means whereby natural and polluted waters may be purified and utilized are of utmost importance for the development of human economy.

Irrigation of land, and especially of desert land, can result in extraordinary improvements in the agricultural productivity of the land. However, irrigation techniques are severely limited in desert areas. By definition, water resources are scarce. Distribution of fresh water from remote locations is generally not practical due to cost constraints in materials and systems as well as water loss during transport, due to evaporation. The use of ground water for irrigation eventually results in salination of the irrigated soil due to trace amounts of mineral salt found in the ground water. As such, the irrigated soil is eventually rendered useless if sufficient quantities of relatively clean water are not available to wash the irrigated soil. This is especially difficult to accomplish in desert areas because of the high evaporation potential of the ambient atmosphere.

As is well known, the diurnal meteorological cycle, as occurs in a twenty-four hour period, involves solar input during the day and radiant heat loss at night. Sunlight causes heating of both the ground surface and the earth atmosphere causing water in both to vaporize during the normal hydrologic cycle. Evaporation and transpiration from the land are the sources of water vapor for the atmosphere. Water vapor is removed from the atmosphere by precipitation and by condensation. However, the amount of water vapor removed by direct condensation at the earth's surface (dew) is relatively small.

Over land, and in the hydrologic cycle, the only source of water is from precipitation. Therefore the average evapotranspiration (the sum of evaporation and transportation) cannot exceed precipitation. Furthermore, it has been found that over 90% of the water used by plant growth is released back to the atmosphere as transpiration water.

Prior art pneumatic enclosures and specifically prior art polydome enclosures are fixed volume. Sunlight causes heating therein, which in turn causes the atmosphere in the enclosure to expand. The ideal gas law states, in part, that at a fixed volume the pressure of a gas changes proportionally to changes in absolute temperature. Thus, prior art pneumatic enclosures would be subject to extreme over-pressurization if all of the heat directed to an enclosure was absorbed. Therefore, currently known pneumatic enclosures must be either vented to control temperature and prevent over-pressurization, treated with a sunlight and heat reflective exterior surface in order to prevent sunlight from entering the enclosure, or a combination of the above. The prior art teaches that it is not possible to close the hydrologic cycle which may occur within a fixed volume pneumatic enclosure.

Air supported structures, or pneumatic enclosures, are generally designed to withstand static and uniform loading produced by inflation pressure within the air supported structure and naturally occurring asymmetric loading produced by airflow over the exterior of the structure, commonly referred to as aerodynamic loading. Typical air supported structures in the art are represented by McLorg Pat. No. Re. 27,232 and McLorg U.S. Pat. No. 5,343,658, the teaching of each of which is incorporated by reference herein. Typically, such pneumatic enclosures are comprised of reinforcement members and cables having membrane panels strung therebetween, the entire system connected to the ground surface via anchoring cables and fixed anchors. The system is inflated and is kept inflated by continuously operable fans which provide sufficient pressure to the interior of the structure. Normal ingress and egress outlets are provided with air locks in an attempt to minimize unwanted pressure losses and relief valves are provided in order to prevent the pressure from becoming too great due to heating. While presently known pneumatic structures may be otherwise readily adaptable to catching the solar energy from sunlight, such as in a greenhouse, it is not possible to close the hydrocycle due to the above-mentioned venting which must occur to prevent overpressurization. As such, presently known pneumatic structures are not able to prevent soil salination if they were to be used in concert with desert irrigation systems of known art.

SUMMARY OF THE INVENTION

Accordingly, it is a feature of the present invention to overcome the disadvantages of the prior art by providing a pneumatic enclosure and method which may be utilized to close the hydrocycle and thereby capture and effectively absorb solar energy as well as to purify and utilize replenishment water and water vapor from evapotranspiration to provide a closed hydrocycle system, in support of a non-salinating desert irrigation system.

This feature, along with other features of the invention are achieved by providing a variable volume polydome enclosure including ballast anchors which allow the polydome enclosure to expand and contract in accordance with the diurnal cycle.

In accordance with the invention, a pneumatic enclosure including a plurality of individual pneumatic membrane panels is provided. The membrane panels are interconnected by a cable reinforcement system with the membrane panels forming substantially the outer surface perimeter of the structure. An anchoring system is provided, attached to the reinforcing system, and includes ballast anchors connected to the reinforcing system as well as fixed anchors, also connected to the reinforcing system. A collection system is provided within the enclosure for capturing condensed water vapor and a distribution system is provided in order that the condensed water vapor may be provided as a water and a power source and recycled within the enclosure.

In accordance with a more specific feature of the invention, the device is a variable volume enclosure comprising a system of translucent pneumatic membranes interconnected with the reinforcement system and further connected to a dual anchorage system comprised of fixed and gravitational ballast anchors. The membranes serve as water condensation collectors which in turn feed a water distribution system. The device operates in a diurnal thermodynamic cycle driven by solar energy and controlled by gravity in concert with the clear night sky. The cycle has two phases: a heating phase where sunlight entering the enclosure increases the temperature, absolute humidity, buoyancy and volume of the enclosed atmosphere, and a cooling phase where the cold radiant effect of the clear night sky induces condensation of water vapor on the interior of the membrane system and general radiant cooling of the enclosed atmosphere, thus decreasing buoyancy, volume and absolute humidity. During the heating phase some of the added atmospheric energy is converted to gravitational potential energy by lifting the ballast anchors as the enclosure expands. During the cooling phase the ballast anchors fall so as to maintain pneumatic pre-stress in the membrane system. The water collected on the membrane has gravitational potential energy, left from the solar added vaporization energy, which may be used for hydroelectric generation as well as pressurization of the distribution system for irrigation, running water, etc. The variable volume enclosure captures water normally lost through evaporation. Importantly, the variable volume condensation and evaporation cycle of the enclosure also serves to close the hydrocycle of transpiration water produced in plant photosynthesis allowing this water, normally lost in irrigation, and especially normally lost in desert irrigation, to be used repetitively through an endless growing season.

The variable volume closed cycle actually provides for plant growth on a continuing basis with a water make-up requirement approximately equal to that actually incorporated in the plant tissues during the growth process and provided for by integral solar distillation purification of any source water. As such, the invention allows that water within the enclosure can be recycled on a continuing basis. This significantly reduces the requirement for supplemental water from outside sources. In addition, the recycled water within the enclosure is distilled since evaporation or transpiration results in all but trace amounts of impurities left behind during the evaporation or transpiration. As such, the very pure recycled water may be used to leach clean the soil in existing irrigated desert locations, like the San Fernando Valley, that are experiencing soil salination as well as to provide for ongoing desert irrigation in new locations. Further, the effect of the supplication of plant photosynthesis is to reduce atmospheric $CO_2$ content and thereby act to reverse the industrial $CO_2$ greenhouse effect.

In accordance with another feature of the invention, the increase in the temperature, absolute humidity, buoyancy and volume of the air when sunlight enters the enclosure causes the enclosure to expand and lift the ballast anchors. Then during night cooling the ballast anchors fall, thus maintaining pre-stress in the membrane and reinforcing system of the enclosure. As such, the structure is normally self supporting without the use of supplemental inflation fans. The anchorage system is an alternation of fixed and gravitational ballast anchors, with preferably the ballast anchors interposed between adjacent fixed anchors.

In accordance with another feature of the invention, the operation of the system may be maintained indefinitely by replacing membranes at the end of their useful life, one at a time, and independently from the reinforcement and reservoir systems, by providing a novel moment-resisting hinge connection system. Such hinge system advantageously allows change of individual membranes from the interior of the pneumatic structure. The use of the moment-resisting system at the membrane termination resists imbalanced forces as short sections of clamping are moved from the old to the replacement membranes.

The present invention provides a variable volume enclosure which may expand upon heating to prevent over-pressurization and effectively absorb solar energy. Prior art pneumatic or polydome enclosures have fixed volume. The sunlight causes heating which would cause extreme over-pressurization in prior art fixed volume enclosures if all the heat was absorbed. Therefore, it must be vented to control the temperature and prevent over-pressurization. The ballast anchor feature of the present invention allows the enclosure to expand and contract while maintaining pneumatic pre-stress in the membrane and reinforcing elements of the enclosure, within a narrow cycle of change. Some of the solar energy is converted to gravitational potential energy by lifting the ballasts during the heating phases of the diurnal cycle. This energy is then released to maintain pneumatic pre-stress against decreasing buoyancy as the ballast anchors fall during the cooling phase of the cycle. Water is employed within the enclosure both as a means for desert envitalization, and, by evaporation, as the primary cooling mechanism for the enclosure. Because the enclosure can expand during the heating phases, the evaporated water can be retained for condensation during the cooling phase. This allows that only relatively minute quantities of newly supplied water are necessary for effective plant growth. The water is also important in maintaining the buoyancy of the enclosure.

As is well known, and can be seen from standard psychometric charts, warm air is lighter than cool air at the same relative humidity. As the humidity rises, the warm air becomes lighter for the same temperature difference. It is also the case that humid air is lighter than dry air at the same temperature. The primary effect of this on buoyancy is that a change in humidity represents a substantial change in the energy of the air, hence its lightness. But is also the case that the heat absorption represented by a change in humidity is latent heat, the heat of vaporization, absorbed as the water changes state from a liquid to a gas. The energy is not subject to reradiation in the same manner that heat absorbed by a change in temperature would be. The vapor must be condensed to release the latent heat. The buoyant humid air remains captive within the variable volume enclosure. The latent heat of the vapor is released later in the diurnal cycle to the cold night sky during the cooling phase of the cycle as the vapor condenses on the inner surfaces of the membrane. The rate of condensation, for given thermodynamic circumstances, depends on the conductivity and emissivity of the membrane.

Radiant cooling of the enclosed atmosphere also occurs during the cooling phase of the cycle. For given radiant circumstances, the rate of radiant cooling depends on the transmissivity of the membrane to the, primarily infrared, radiant spectrum of the enclosed environment.

During the cooling phase, at night, the enclosed atmosphere increases in density and decreases in buoyancy and volume. The timing of this corresponds to night cooling of the ambient atmosphere that also brings about a decrease in buoyancy of the ambient atmosphere. Since the enclosed atmosphere has effectively absorbed solar energy during the day which may be controllably released at night, while the ambient atmosphere convects throughout during the day and re-radiates directly to the sky at night, a difference between the energy levels and buoyancy of the two may be maintained through both phases of the cycle.

As such, the enclosed atmosphere exists in an oscillatory high energy state relative to an oscillatory low energy state of the ambient atmosphere. Therefore, the buoyancy of the system will oscillate in a pattern that directly corresponds to the oscillating difference between the energies of the two atmospheres (i.e. the enclosed atmosphere within the enclosure and the ambient atmosphere). In principle, the enclosed atmosphere reaches a state of dynamic thermal equilibrium, resulting from the opposing factors of daily solar heating and variable ongoing cooling, especially radiant cooling occurring at night. The greater rate of daytime absorption and delayed night time release results in an elevated temperature that, in turn, results in a greater rate of heat loss when cooling. Thus, the enclosure at equilibrium exists at an oscillating elevated energy level and cycles the daily solar input largely through an enclosed, energy converting, hydrologic cycle, with convective and conductive losses increasing with elevating temperature.

Similarly, the enclosed hydrologic cycle, or condensation cycle, reaches a state of dynamic equilibrium, cycling a portion of the daily solar input that depends primarily on the altitude of the enclosure, or effectively the mass of the enclosed atmosphere. As can be seen from pyschrometric charts, as the temperature of air increases by absorbing energy, the capacity of the air to absorb water vapor and latent energy increases at an even greater rate. As such, a decreasing mass of enclosed atmosphere results in an increase of temperature change in the cycle, to maintain equilibrium, resulting in a greater increase in the change of vapor content, up to saturation, in the condensation cycle of the enclosed atmosphere. The capacity of a given variable volume enclosure to cycle water and generate electricity may be increased by decreasing the operating altitude thereby increasing the operating temperature and amount of vapor in cycle. However, the temperature increase involved in increasing the water in cycle will, at some point, exceed the plants thermal tolerance, inhibiting plant vitality and photosynthesis. There is therefore, for any given prospective circumstance, a nominally ideal operating altitude and oscillation for the preferred, specific purposes of the enclosure.

The magnitude of the operating altitude and oscillation is specific to any given system and its circumstances of operation must be resolved for that system. The analysis and design of a successful system must take into account climate, meteorological, thermodynamic, spectral and structural specifics. Considerations will include, but are not limited to, the thermal value of cyclical sunshine, the range of deviation and magnitude of local nighttime radiant cooling, the expansion ratio and stress cycle of the membrane system, the appropriate spacing of the anchors and mass of the ballasts, acceptability of the range of change of internal conditions, the appropriate depth or mass of enclosed atmosphere and other relevant details that become important in the reduction to practice, including cost and availability of materials, ease of installation, etc. Such engineering and design for a site-specific design in accordance with the present invention, may be accomplished by those skilled in the art.

In a first aspect, the present invention provides a variable volume enclosure anchored to the ground, said enclosure comprising: (a) a plurality of membrane panels; (b) a reinforcement system for interconnecting said membrane panels; (c) anchor means coupled to said reinforcement system for anchoring the enclosure to the ground; (d) said anchor means having ballast anchors for varying the volume of the enclosure.

In another aspect, the present invention provides a method for irrigating soil in portions of arid regions, said method comprising the steps of: (a) providing a variable volume enclosure; (b) providing an initial and replenishment water supply inside said enclosure; (c) capturing said water supply within said enclosure caused by evaporation inside said enclosure and transpiration from plants located inside said enclosure; (d) distributing said captured water within said enclosure as irrigation water.

In yet another aspect, the present invention provides a variable volume pneumatic enclosure comprising: (a) a flexible membrane forming a surface perimeter of the enclosure; (b) prestressed reinforcing means connected to said flexible membrane for supporting the enclosure; (c) means for anchoring the enclosure, said means for anchoring including ballast anchor means connected to said prestressed reinforcing means; (d) means for collecting condensed water within said enclosure; and (e) means for generating electrical power from distributing said condensed water vapour.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein:

FIG. 7A shows the relationships described in FIG. 6A during winter months;

FIGS. 20–22 schematically illustrate stages in the process by which a variable volume enclosure is installed and attains operating altitude;

FIG. 20 is a broken partial plan of the variable volume enclosure shown in FIG. 1;

FIG. 21 is a cross-section taken along line 21—21 in FIG. 20; and

FIG. 22 is a cross-section taken along line 22—22 of FIG. 22.

DETAILED DESCRIPTION OF THE PREFERRED EMBODIMENTS

Figure 1:
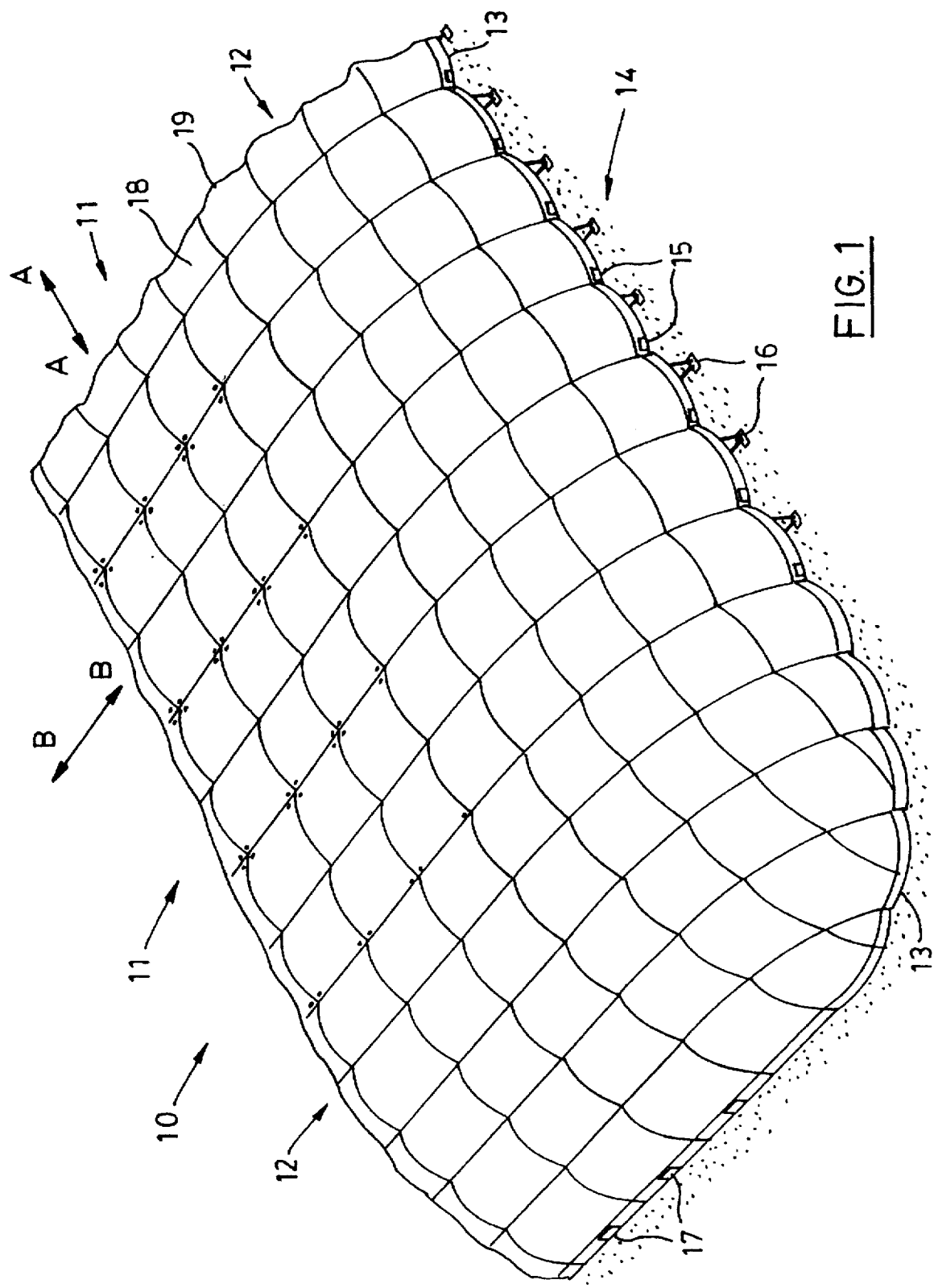
FIG. 1 is a pictorial view showing an exterior corner of a variable volume pneumatic enclosure of the present invention.

Referring now to the drawings, wherein the showings are for the purposes of illustrating preferred embodiments of the invention only and not for the purposes of limiting same, FIG. 1 shows a variable volume pneumatic polydome enclosure 10 in accordance with the present invention. Enclosure 10 extends in transverse direction A—A and longitudinal direction B—B beyond the figure shown. Enclosure 10 includes an upper portion 11 as well as the lower side portions 12 terminating at perimeter anchorage 13, which is then at the ground surface 14. The structure also includes doorways 15 or other means of ingress and egress. As is common with an air-supported structure, doorway 15 is preferably provided with air locks in order to minimize leakage of air from the enclosed space therein. Inflation fans 16 are provided to maintain positive pressure within the enclosure as needed during operation. The inlet dampers 17 are provided to allow air intake during certain periods of buoyant operation. The outer surface 18 of enclosure 10 is comprised of a translucent flexible membrane 19 and is preferably made of a highly translucent membrane manufactured by Hoechst AG. Membrane 19 is a coated fabric whose light transmittance corresponds to that of a sheet material consisting of inorganic or organic glasses. It consists of a fluoropolymer monofilament fabric and is coated with Hostaflon TFB. The light transmittance values are between 80 and 95% with the spectrum of sunlight passing unchanged through the material, whereas conventional glass fabrics with a PTFE coating have light transmittances of only 10–20% with spectral aberration. As is preferred with all air supported structures, the membrane is highly weather resistant, resistant to high & low temperatures, dirt repellant, self-cleaning and flame retardant. The membrane also has a light scattering effect permitting uniform illumination.

Figure 2A:
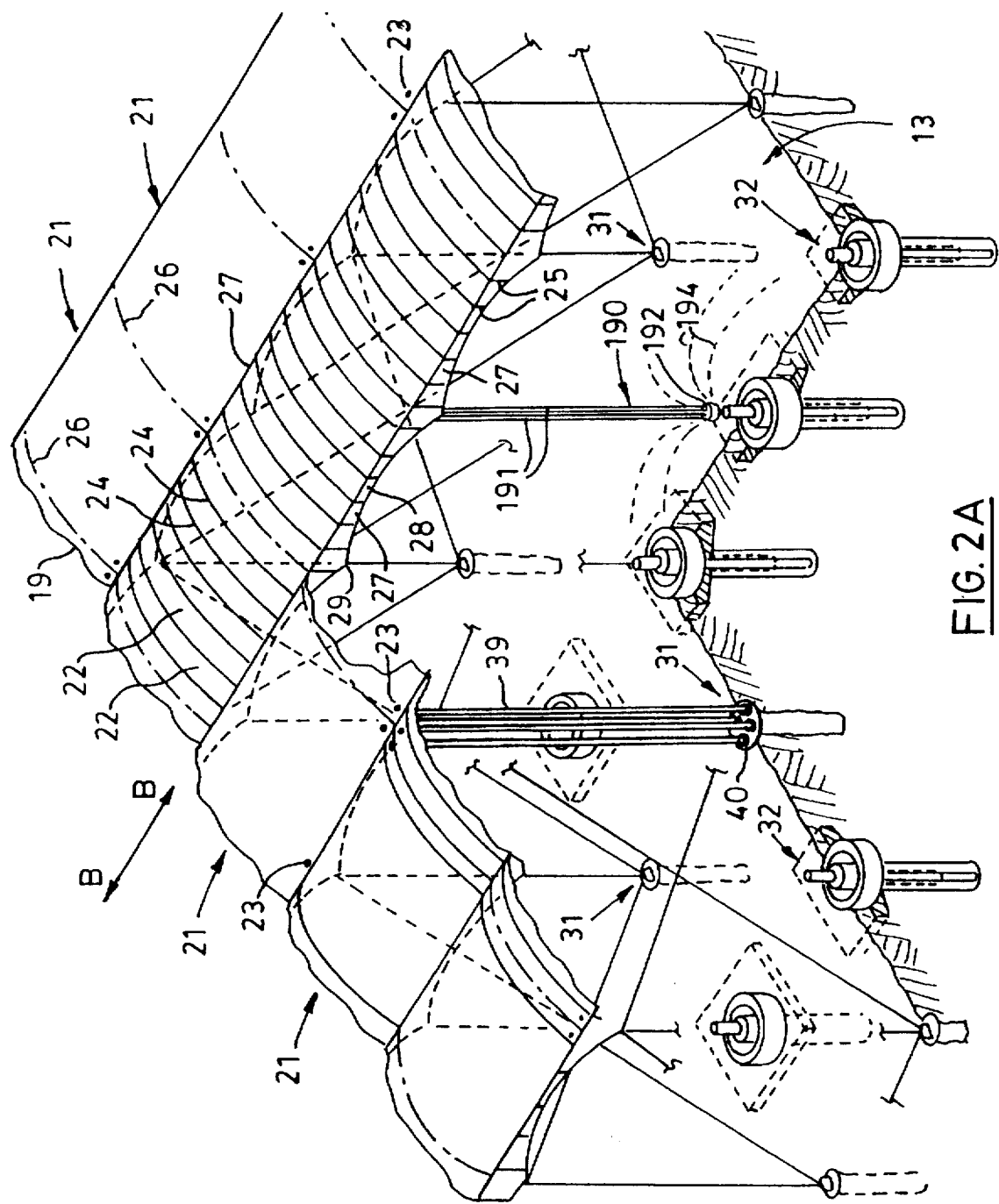
FIG. 2A is a pictorial detail view partially in section, showing a variable volume pneumatic enclosure of the present invention.
Figure 2B:
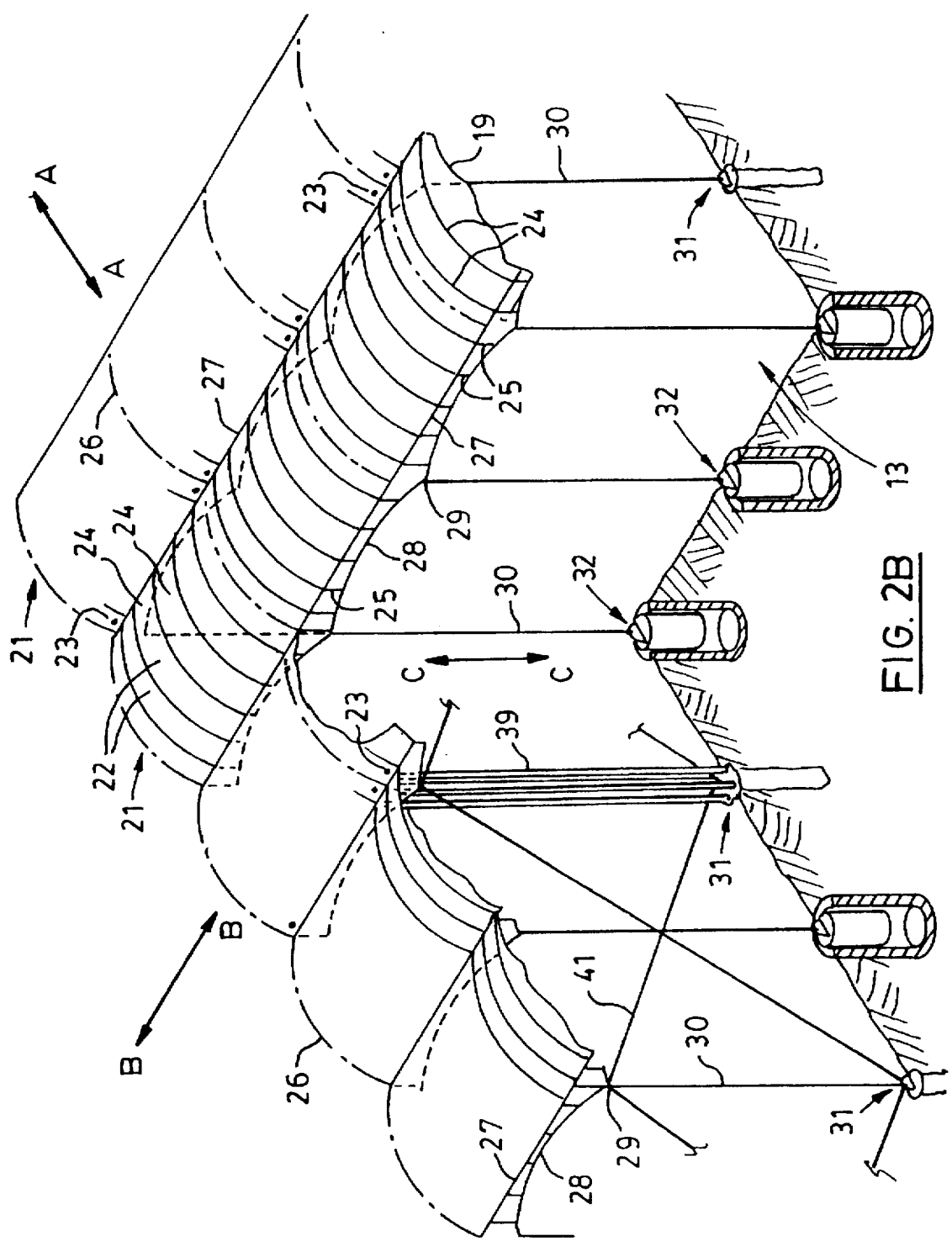
FIG. 2B shows a simplified embodiment of the system of FIG. 2A.

A detail of flexible membrane 19 is shown at FIG. 2A and 2B. Membrane 19 is comprised of sections 21 disposed in edge to edge relation, adjacent edges secured together to provide overall outer surface 18. Each section 21 is constructed from flat panels 22, typically of generally rectangular shape with patterned curvature at their ends. The patterned curvature at the ends of panels 22 is such that they are slightly longer along a line halfway between opposite longitudinal edges. Additionally, section 21 is longer in the direction of panels 22 than the plan length covered. Thus, the completed membrane section is square when viewed in plan, but naturally assumes a ribbed arch form when inflated by internal air pressure. Flat panels 22 are adhered together with their adjacent edges overlapping. Certain of membrane sections 21 may include a vent valve 23 to assist in regulating the internal pressure of the structure with respect to the outside pressure. Vent valves 23 are closed during normal operation. Additionally, vent valves 23 are provided only along the fixed anchor edges of sections 21 and are preferably of solenoid operating type in order that they may be closed or opened as required. Each of panels 21 is joined together with a system of clamps and reinforcing and tension cables, including the panel cables 24 between adjacent panels 22 and the arch base cables 25 and catenary cables 28 between adjacent arch bases of sections 21. Adjacent edges of sections 21 that are parallel with panels 22 are joined with rope bead clamps 26 or other means known in the art. Arch base edges of sections 21 are clamped together with the hinge connection 27. Preferably, cables 24, 25 and 28 are of galvanized or stainless steel construction. Panel cables 24 overlay flat panels 22 along the lengths of cables 24 by being located above and between overlapping seam edges of panels 22 where a valley forms by pattern, between the panels, upon inflation.

Tension cables 24, 25 and 28 reinforce membrane 19 and individual sections 21 to carry tensile forces which are induced in membrane 19 to the cable connections 29 and then to the tethering cables 30 which ultimately attach to ground surface 14 by means of the fixed anchors 31 of the ballast anchors 32. Each of tethering cables 30 is connected to catenary cables 28 by cable connector 29, below the intersection of adjacent membrane sections 21 and thus are common to a plurality of tension cables 24, 25 at different sections. As shown in FIG. 2A and 2B, a preferred embodiment of the invention utilizes tethering cables 30 having a spacing of 200' therebetween. Thus, each of sections 21 have a pneumatic radius of the membrane section 21 of approximately 125' (due to the arched configuration of each of sections 21 described hereinabove).

Figure 3A:
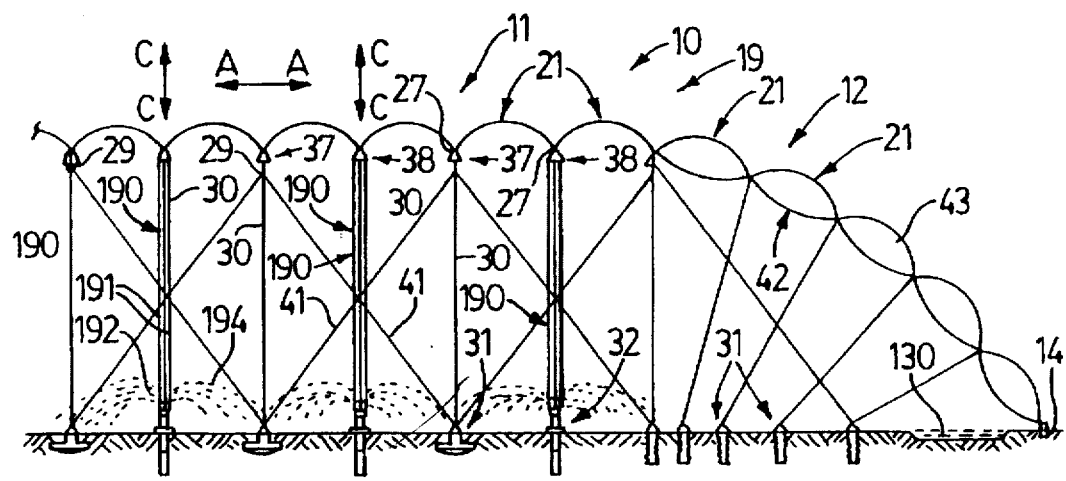
FIGS. 3A–3C are detail views of the corner shown in FIG. 1.
Figures 3B, 3C:
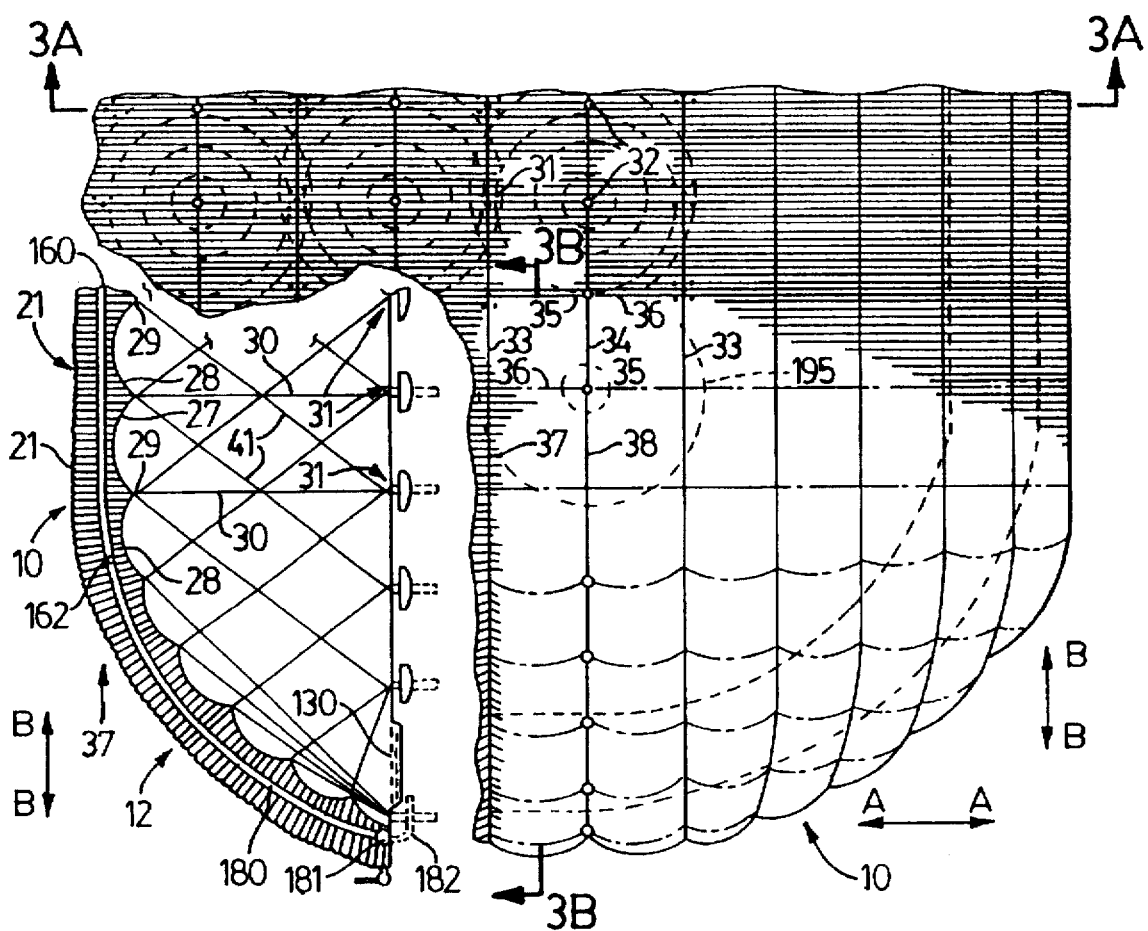

FIG. 3A, 3B and 3C show further details of enclosure 10 and of individual membrane sections 21. Specifically, each of sections 21 is anchored by two fixed anchors 31 and two ballast anchors 32. As shown, each of sections 21 includes membrane edges 33, 34, 35 and 36. Tethering cables 30 thus are comprised of the fixed anchor lines 37 (connected to fixed anchors 31) and the ballast anchor lines 38 (connected to ballast anchors 32). Each membrane edge 33 spans between adjacent tethering cables 30 ultimately connected to adjacent fixed anchors 31. Each membrane edge 34 spans between tethering cables 30 ultimately connected to adjacent ballast anchors 32. Membrane edges 35, 36 span between tethering cables 30 ultimately connected to one fixed anchor 31 and one ballast anchor 32. As such, fixed anchor lines 37, comprised of fixed anchorage elements, remain at a fixed height while ballast anchor lines 38 comprised of ballast anchor elements, rise and fall with ballast anchors 32, in the direction of arrow C—C, to vary the volume of enclosure 10. Additionally, membrane edges 35 and 36 flex between fixed anchor lines 37 and ballast anchor lines 38 to accommodate the vertical motion of ballast anchor lines 38. Additional cross-sectional reinforcing of enclosure 10 may be provided by cross-sectional bracing cables 41 which are placed diagonally and attached from fixed anchors 31 at grade to cable connectors 29 serving adjacent fixed anchor lines 37, in the direction A—A and to diagonally spaced cable connectors 29, along fixed anchor lines 37, in the direction B—B. Preferably, cross-sectional bracing cables 41 are strung in both A and B directions of enclosure 10, between perimeter end walls to provide maximum stability and wind resistance.

Additional wind resistance features of the present invention are also shown in FIG. 3A. Specifically, the translucent flexible membrane sections 21, comprising the lower side portions 12 of enclosure 10 are opposed by liner membrane sections 42, like membrane sections 21 in all aspects except disposition within lower side portions 12. Liner membrane sections 42 serve to form a lenticular space 43 with membrane sections 21. Lenticular space 43 may be secondarily pressurized to compensate for loss of buoyancy pressure in the development of pneumatic pre-stress for membrane stability in membrane 19 as it approaches ground surface 14.

Additionally, liner membrane 42 serves to affect a secondary seal in the event that membrane 21 is punctured by wind-born debris during periods of high wind, or by other effects. If damage to membrane section 21 is sufficient, pressure within lenticular space 43 will be lost, whereupon internal pressure within enclosure 10 will cause liner membrane 42 to collapse against membrane 21, thereby effecting a seal over said damage in membrane 21.

Figure 4:
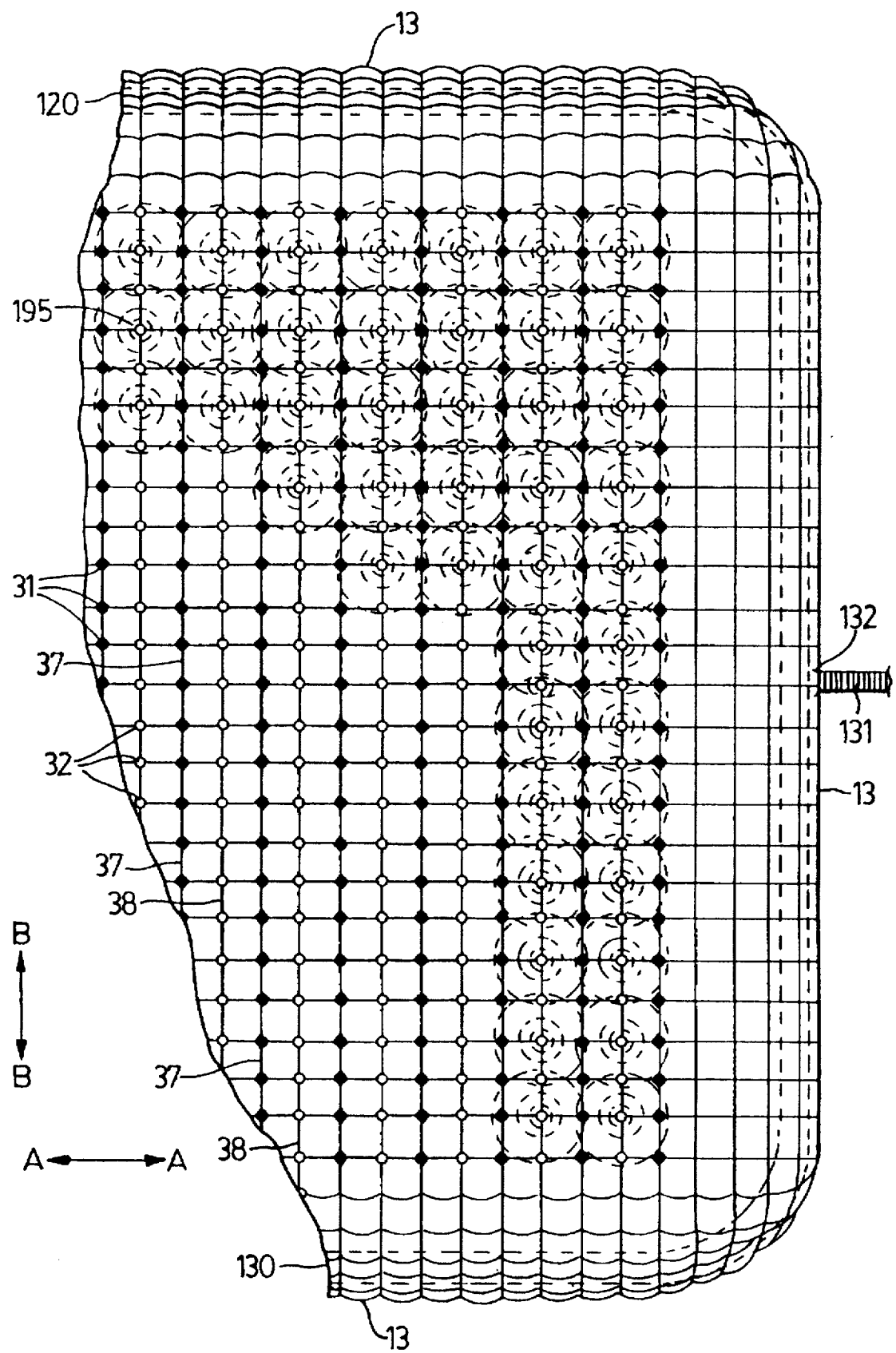
FIG. 4 is a schematic partial plan view of one end of the variable volume enclosure of the present invention.

The plan view of FIG. 4 shows the dual anchorage system of the present invention. As shown, the dark diamonds show the fixed anchors 31 while the light circles show the ballast anchors 32. In the transverse direction defined by arrow A, each of ballast anchors 32 is disposed between adjacent fixed anchors 31. In the longitudinal direction defined by arrow B, each of fixed anchors 31 is adjacent to an additional fixed anchor while each of ballast anchors 32 is adjacent to another ballast anchor 32. In the preferred embodiment, the spacing between each of anchors 31 and 32 in the longitudinal direction is preferably 200 feet while the spacing between adjacent fixed anchors 31 or ballast anchors 32 in the transverse direction is also preferably 200 feet.

The series of fixed anchors 31, that follow in one line, in direction B—B, from perimeter anchorage 13 to opposite perimeter anchorage 13, constitute, with associated cables and connectors, a single fixed anchor line 37. Similarly, a like series of ballast anchors 32 and associated elements constitute a single ballast anchor line 38, so that substantially the whole of enclosure 10 is a variable volume enclosure.

As is also shown in FIG. 4, enclosure 10 includes an evaporation swale 130, running substantially about the inside perimeter of enclosure 10. Preferably, as is shown in FIGS. 3A, 3B, evaporation swale 130 is a shallow earthwork lined with a black, water impervious, chemically resistant, liner such as neoprene membrane. The evaporation swale 130 acts as the reservoir of primary evaporation for enclosure 10. It may be filled with various refinable waters as are most convenient to the circumstance of a particular installation. For example, seawater may be used if the installation is near a coast as around the Red Sea; sparse seasonal rain may be collected at perimeter anchorage 13 and initially stored in the swale 130, as would suit areas of the Australian Outback; waters may be conservingly obtained from drilled wells as would be fitting in areas of the Central Sahara. FIG. 4 shows preferably where seawater 131 enters enclosure 10 and particularly evaporation swale 130, at swale port 132. The seawater 131 then flows around evaporate swale 130 by gravity. As it is flowing, seawater 131 is warmed by sunlight entering enclosure 10, through translucent membrane 19. Due to the warming, some water evaporates into the enclosed atmosphere. The concentrated seawater may then exit enclosure 10 by another swale port 132 at the opposite end of enclosure 10. For this purpose, swale port 132 is a lined earthwork though flowing through an opening in perimeter anchorage 13 where the trough is keep full to seal the opening in perimeter 13. By this means, a series of enclosures 10 may be supplied with "fresh" seawater and drained of concentrated seawater by a single set of supply and drainage channels.

FIGS. 5A–5F show a cross-section of enclosure 10 taken during different relevant times in a twenty-four hour diurnal cycle involving solar input during the day and radiant heat loss at night. The translucent flexible membrane 19 employs the potential of solar energy to develop buoyancy pressure to provide the pneumatic pre-stress of the air supported structure 10. Variable volume enclosure 10 expands during the day and contracts at night due to the effects of solar energy input and radiant heat loss.

The sun's solar energy causes heating of the interior of the structure. By keeping vent valves 23 closed and otherwise preventing air loss from structure 10, the pressure within structure 10 will increase, and cause tension in each of membrane sections 21 and cables 24, 25, 28, 29, 30 and 41 to increase proportionally. With prior art fixed volume enclosures this increasing pressurization must be vented to prevent over-pressurization and over-stress of the enclosure. However, enclosure 10 of the present invention, expands in volume, thus maintaining a relatively constant internal pressure and eliminating the requirement of continuous venting. The variable volume enclosure expands and contracts all the while maintaining the pneumatic pre-stress in membrane sections 21 and tension in cables 24, 25, 28, 30 and 41 to keep structure 10 stable. It is contemplated that such a structure of the present invention will optimally work in areas of aridity such as in desert regions where the air is clear and fluctuation between day and night temperatures is greatest. Such environment is generally lacking in cloud cover for most of the year, thus allowing optimum sunlight as well as the optimum radiant cooling effect provided by a clear night sky. In the examples illustrated herein, the enclosure has been designed at a latitude of 28°, which coincides with the Northern Sahara Desert in Africa, the most arid regions of the middle east and the Central Australian Outback.

Figure 5A:
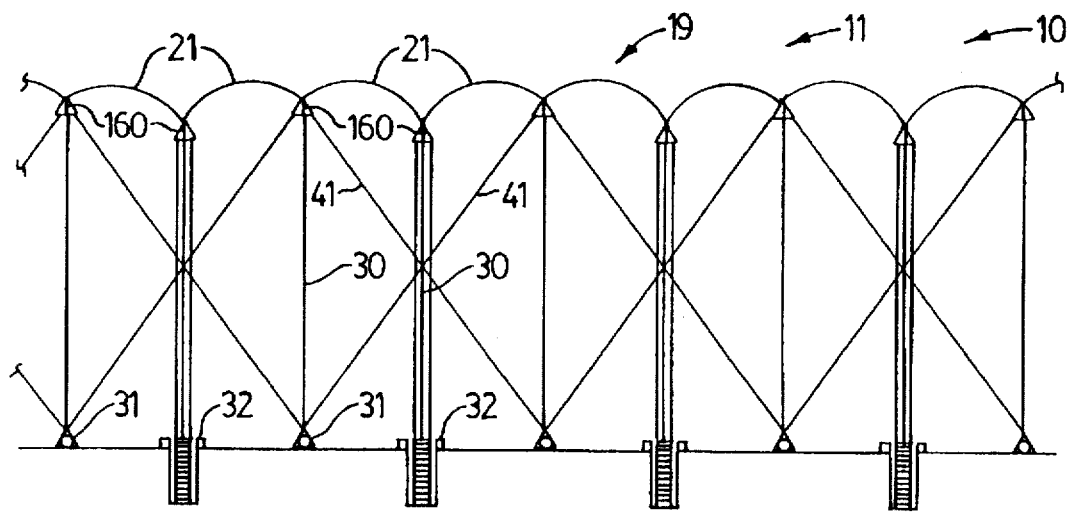
FIGS. 5A–5F show successive schematic sectional views taken at different time periods in a twenty-four hour cycle of the enclosure of FIG. 1.
Figure 5B:
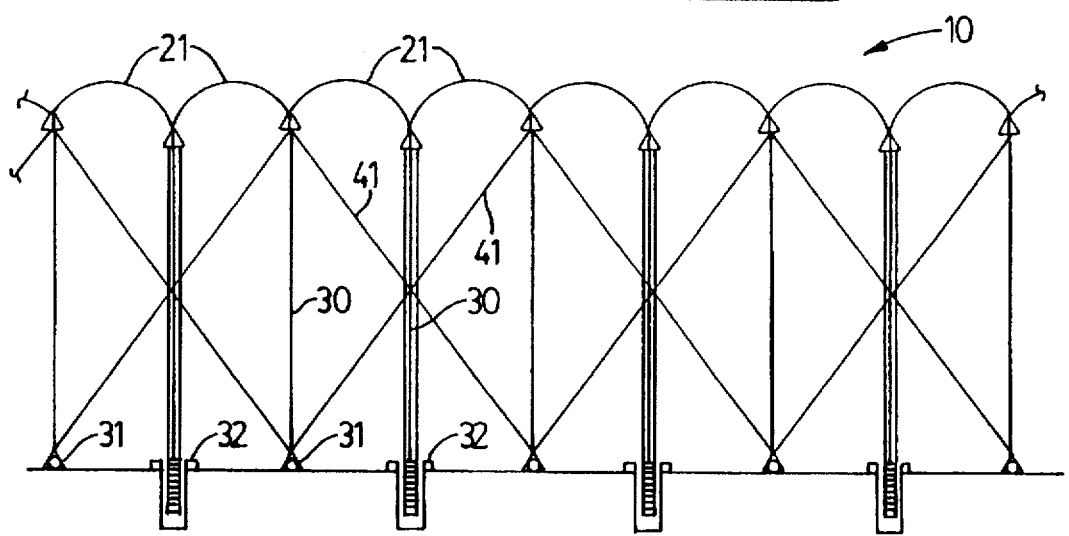
Figure 5C:
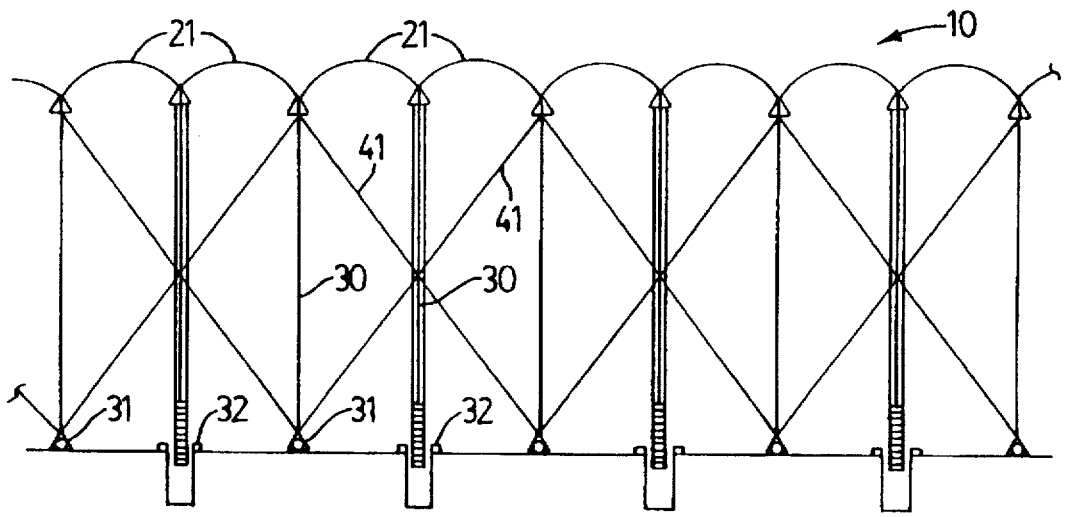
Figure 5D:
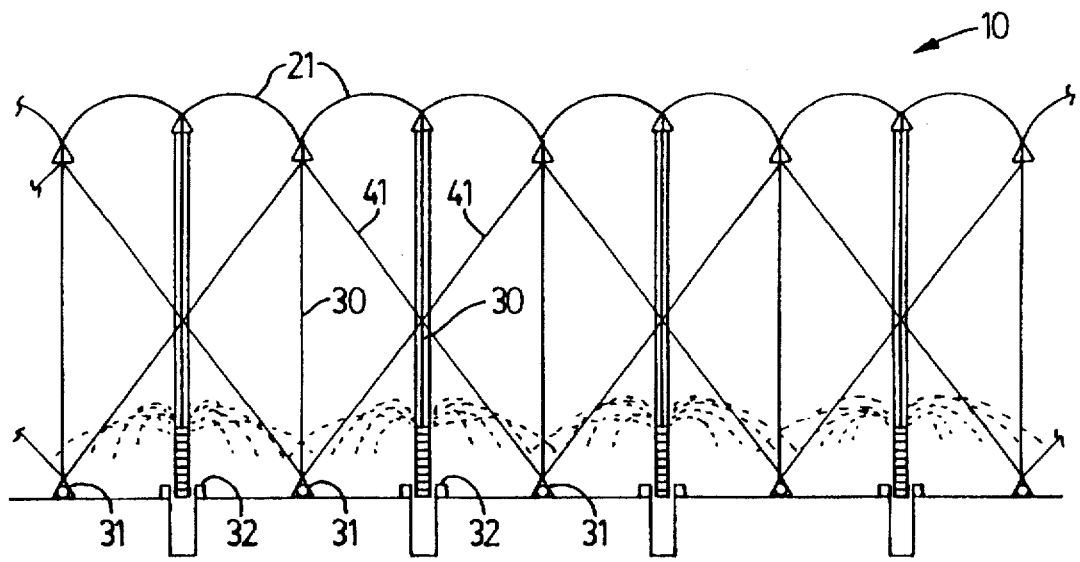
Figure 5E:
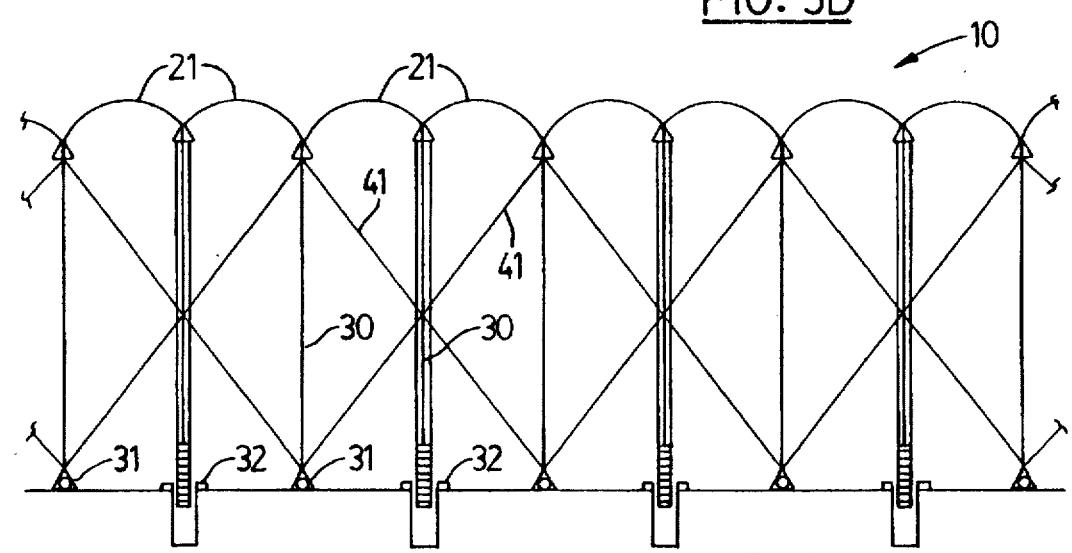
Figure 5F:
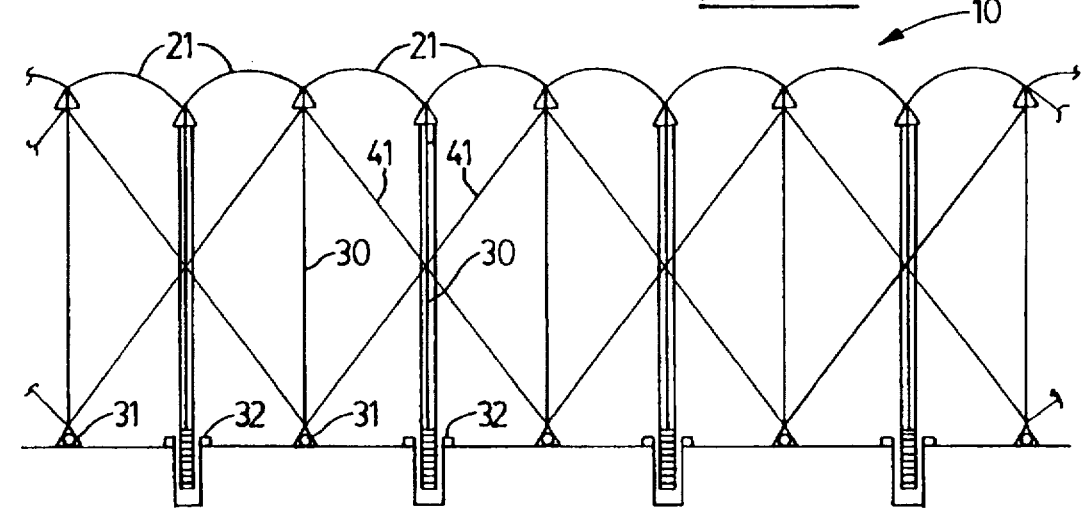

As shown in FIG. 5A, membrane sections 21 are at their lowest altitude during the twenty-four hour cycle at approximately 4:00 a.m. At sunrise or shortly thereafter, 8:00 a.m. as shown in FIG. 5B, buoyancy increases, and upper portion 11 of membrane 19 rises. New air is taken in from the outside ambient atmosphere via inlet valves 17, preferably located along the perimeter anchorage 13 of enclosure 10. At approximately midday, 12:00 noon, as shown in FIG. 5C, the buoyancy of enclosure 10 continues to increase. At this point vapor has been rising within structure 10. The structure 10 continues to take in new air from the outside ambient atmosphere through the inlet dampers 17 as it rises. As shown in FIG. 5D, during late day, at approximately 4:00 p.m., the buoyancy becomes briefly stable and is at a daily maximum. Water vapor within the enclosed atmosphere is at a maximum. Membrane sections 21 are now at their highest altitude with variable volume enclosure 10 at its greatest volume. In order to maintain this buoyancy and altitude, inlet dampers 17 are closed. As shown in FIG. 5E, at approximately 8:00 p.m. the first effects of a clear cool night sky initiate cooling of the interior atmosphere within enclosure 10. The structure 10 begins to decrease in volume and the upper portion 11 begins to fall toward grade level or ground 14. Condensation begins when the dew point is attained as the temperature and pressure decrease and the relative humidity increases. The water vapor content or absolute humidity also decrease as condensation proceeds. As shown at FIG. 5F, during midnight and late night, cooling and condensation continue. As this happens, the enclosed atmosphere becomes continually dryer as the amount of condensation collected by means described hereinbelow, increases. During this period, the rate of condensation drops as the available vapor is condensed. Just prior to sunrise, the enclosure 10 achieves its position shown in FIG. 5A, in which cooling is essentially complete, condensation is essentially complete and cool, dry and assuming photosynthesis within enclosure 10, oxygen rich, carbon dioxide poor air comprises the atmosphere within enclosure 10. Vent valves 23 (FIG. 2A) have been opened to dispel some of the dry oxygen rich air under the pressure of falling ballast anchors 32 attached to falling membrane 19, or by running installation fans 16. As the sun rises the cycle begins again.

Figure 6A:
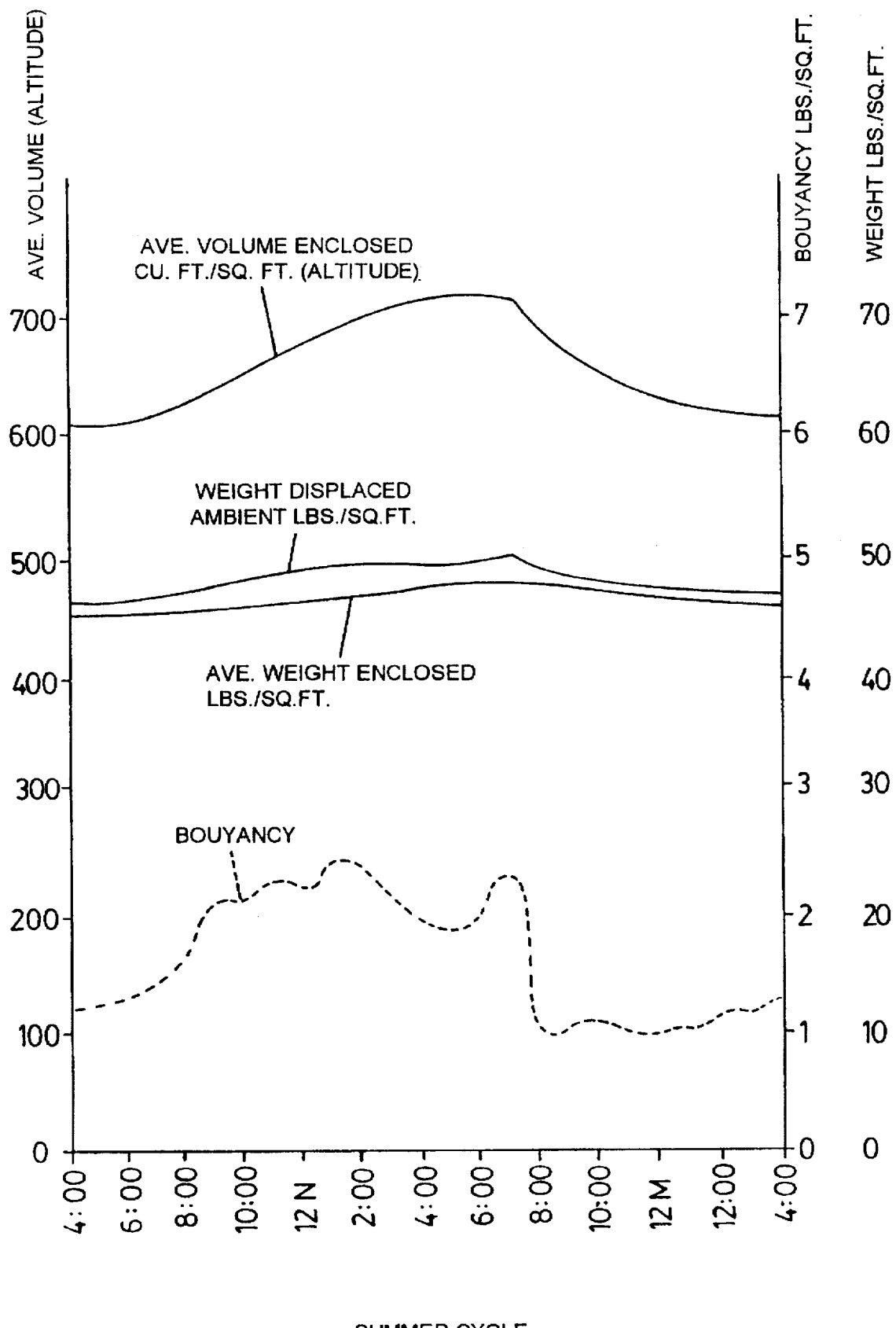
FIG. 6A is a graphic representation of the relationships of certain design considerations in a given variable volume enclosure over a twenty-four period during summer months.
Figure 6B:
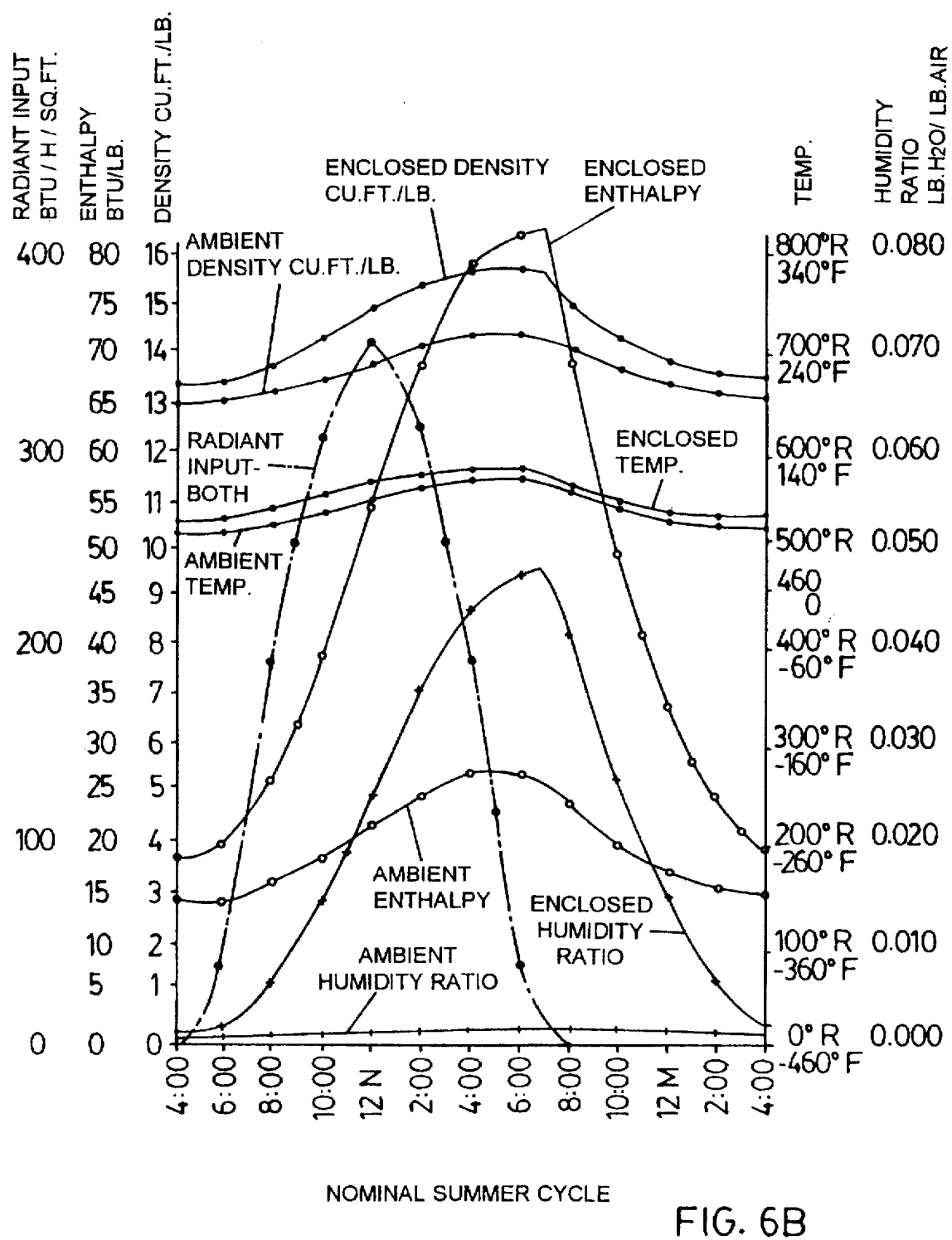
FIG. 6B is a graphic representation of the thermodynamic conditions which affect variables in FIG. 6A over the same twenty-four hour period.
Figure 7B:
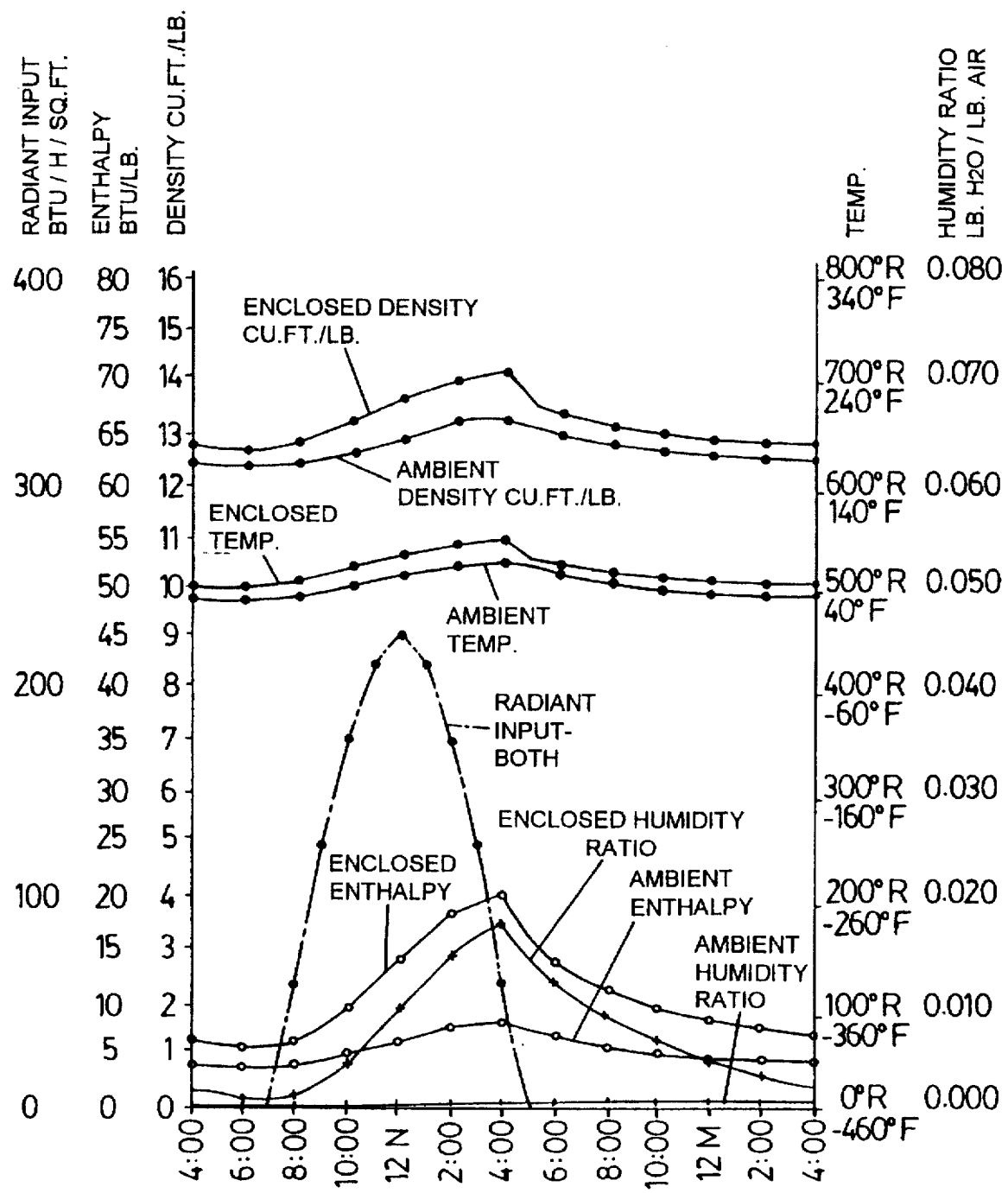
FIG. 7B shows the thermodynamic conditions which affect FIG. 7A during winter months.
Figure 8:
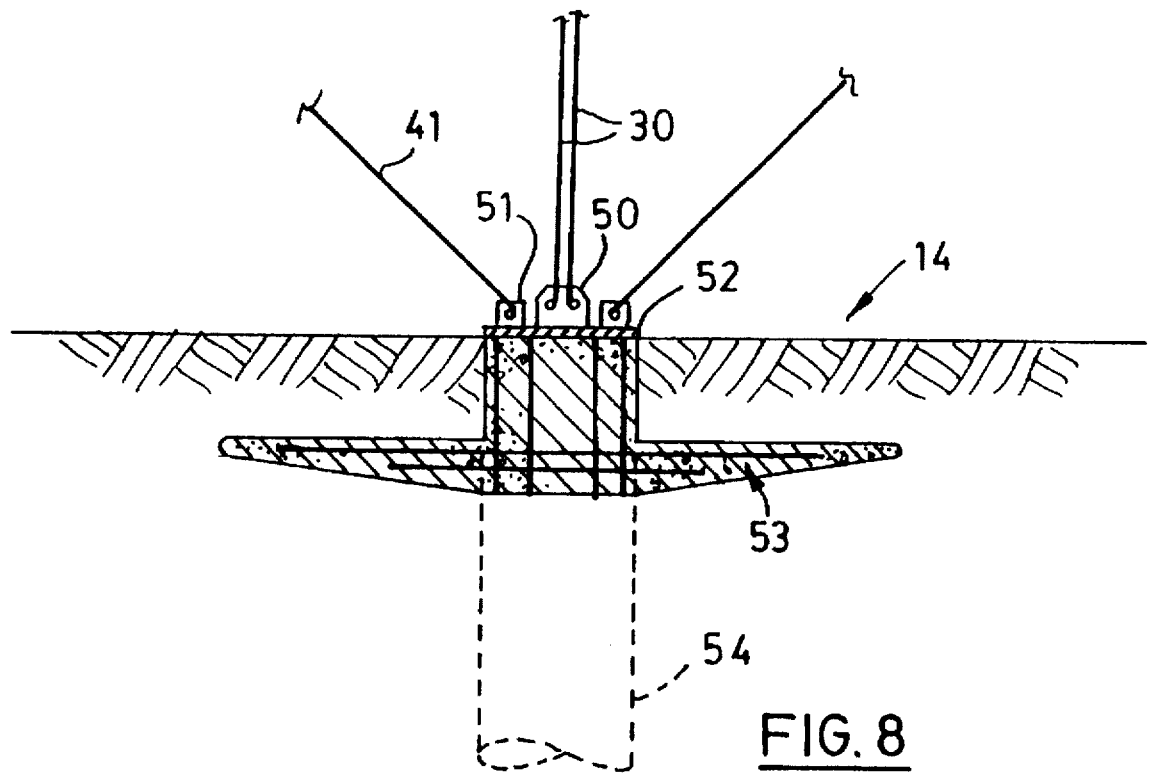
FIG. 8 is an elevation view, in partial cross-section, of a fixed anchor in accordance with the present invention.
Figure 9:
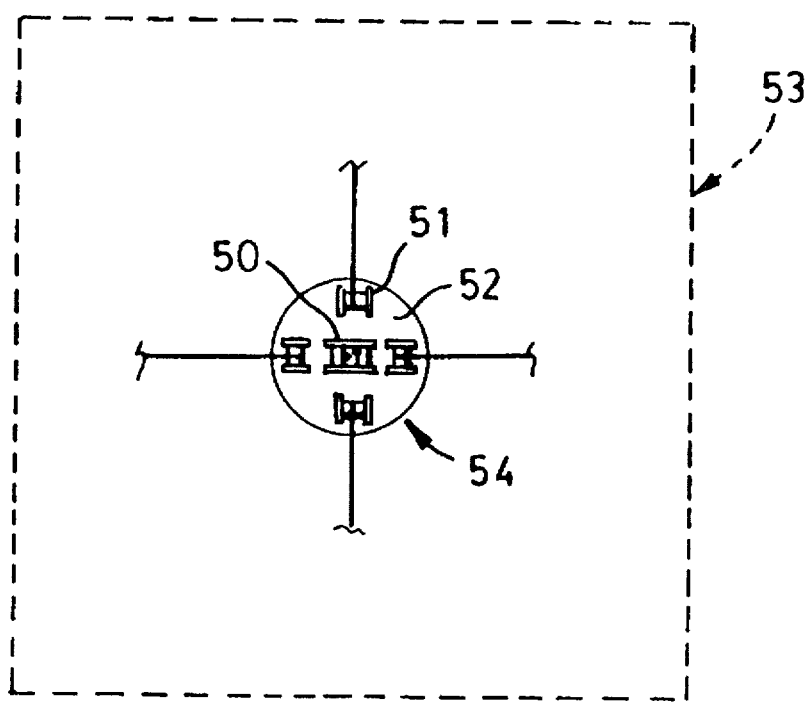
FIG. 9 is a plan view of FIG. 8.

FIGS. 6A and 6B and FIGS. 7A and 7B show a design example of a variable volume pneumatic enclosure. FIGS. 6A and 6B show a summer cycle, while FIGS. 7A and 7B show a winter cycle. In the example given, the enclosure is designed at 28°$^N$ latitude in a very hard arid desert area, which is an area naturally approaching zero humidity. The enclosure is given a fixed anchor height of 600', i.e. the distance from ground 14 to hinge connection 27 is 600'. The average altitude of the upper portion 11 at the bottom of the stroke of the variable volume enclosure is 614' on an enclosed atmosphere of dry air, at standard pressure weighing 45.61 pounds per square foot. At this latitude, in June, 2890 btu's per square foot are received through translucent membrane 19, through the course of a day. The distribution of sunlight is shown in the curve in FIG. 6B labelled Radiant Input. During the course of a typical day, little cooling takes place between the enclosure 10 (enclosed atmosphere) and the ambient atmosphere (outside enclosure 10), because they are at a similar absolute temperature Rankine. The radiant input of solar energy results in a change of energy for both the enclosed and ambient atmosphere shown on the Ambient Enthalpy and Enclosed Enthalpy curves, Enthalpy being a measure of the total energy of a vapor bearing gaseous system. By applying the change in energy value within the system, one may determine the change in enthalpy from psychometric charts for the enclosed atmosphere. The change in the vapor content of the enclosed atmosphere is plotted as the curve labelled Enclosed Humidity Ratio and likewise, for the ambient atmosphere by the Ambient Humidity Ratio. In the design herein, the enclosed atmosphere is presumed to have an open availability of water within the enclosure, for evaporation and nominally primarily from well irrigated growing plants but also secondarily, from evaporation swale 130. Such water must be initially provided when the structure is constructed in order to "charge" the atmosphere to begin the cycle and added thereafter to compensate for any loss of water in the condensation cycle. The absorption of energy results in a change of temperature and humidity, thus resulting in the changes in density shown on the curves labelled Enclosed Density and Ambient Density. Finally, the changes in energy and density of the enclosed atmosphere result in changes of volume shown on the Enclosed Average Volume curve of FIG. 6A. This curve, in effect, shows the average altitude of the variable volume of enclosure 10 at any given time. The weight of the enclosed atmosphere is nearly constant, and fluctuates only with the change in vapor content and the low mass atmospheric exchanges described above for FIGS. 5A–5F. However, in contrast, the weight of the Displaced Ambient Atmosphere varies substantially because of the change in volume of the enclosure as shown on the curves labelled Displaced Ambient Weight and Enclosed Average Weight. The difference between the Displaced Ambient Weight and the Enclosed Average Weight is the resulting buoyancy of the enclosure, plotted as the Buoyancy Curve shown at the bottom of FIG. 6A.

FIGS. 7A and 7B show corresponding curves to FIGS. 6A and 6B, differing in that FIGS. 7A and 7B showing the curves are resulting from a winter season. Although significantly different amounts of energy are involved in the summer and winter cycles, the buoyancy remains similar because it derives from a ongoing difference between the ambient and enclosed atmospheres.

As previously discussed, the example of FIGS. 6 and 7 is based on a design having an anchor spacing of about 200'between adjacent anchors 31 and 32 and a pneumatic radius in the membrane of approximately 125'. The buoyancy cycle is from about 0.8 to 2.5 lbs. per sq. ft. With this radius, the changing buoyancy pressure results in a stress cycle in the membrane of approximately 112 lbs./lineal ft. to 312 lbs./lineal ft. For reference, prior art fixed volume, ground mounted air structures are typically in the normal operating range of 325 lbs./linear ft. Thus the higher stress cycle figure is in the range of normal operating pre-stress for fixed volume air structures. The 112 lb./linear ft. stress cycle figure would only provide mild wind resistance that could require augmentation by inflation fans 16 while the buoyancy is low. Thus, when a location or particular weather pattern demands high wind resistance, inflation fans 16 could be operated on an ongoing basis to provide for elevated pressure requirements within the enclosure. Thus, the enclosure would still act against ballast anchors 32, of greater weight, while allowing the variable volume enclosure 10 to absorb energy and contain the water vapor to keep the hydrocycle closed.

In order to accomplish this result the alternating fixed anchors 31 and ballast anchors 32 shown in FIGS. 2, 3 and 4 are described in detail in FIGS. 8–11. Fixed anchor 31, shown in FIGS. 8 and 9, comprise tethering cable winch 50, bracing cable winch 51, and winch mounting plate 52 and inverted "T" reinforced concrete earth anchor 53, or alternate concrete pier anchor 54, to transfer tensile forces to the ground. As shown, tethering cable 30 is attached to tethering cable winch 50, and bracing cables 41 are attached to bracing cable winches 51, with the winches fastened to mounting plate 52, which is in turn fastened to earth anchor 53, or pier anchor 54.

Figure 10:
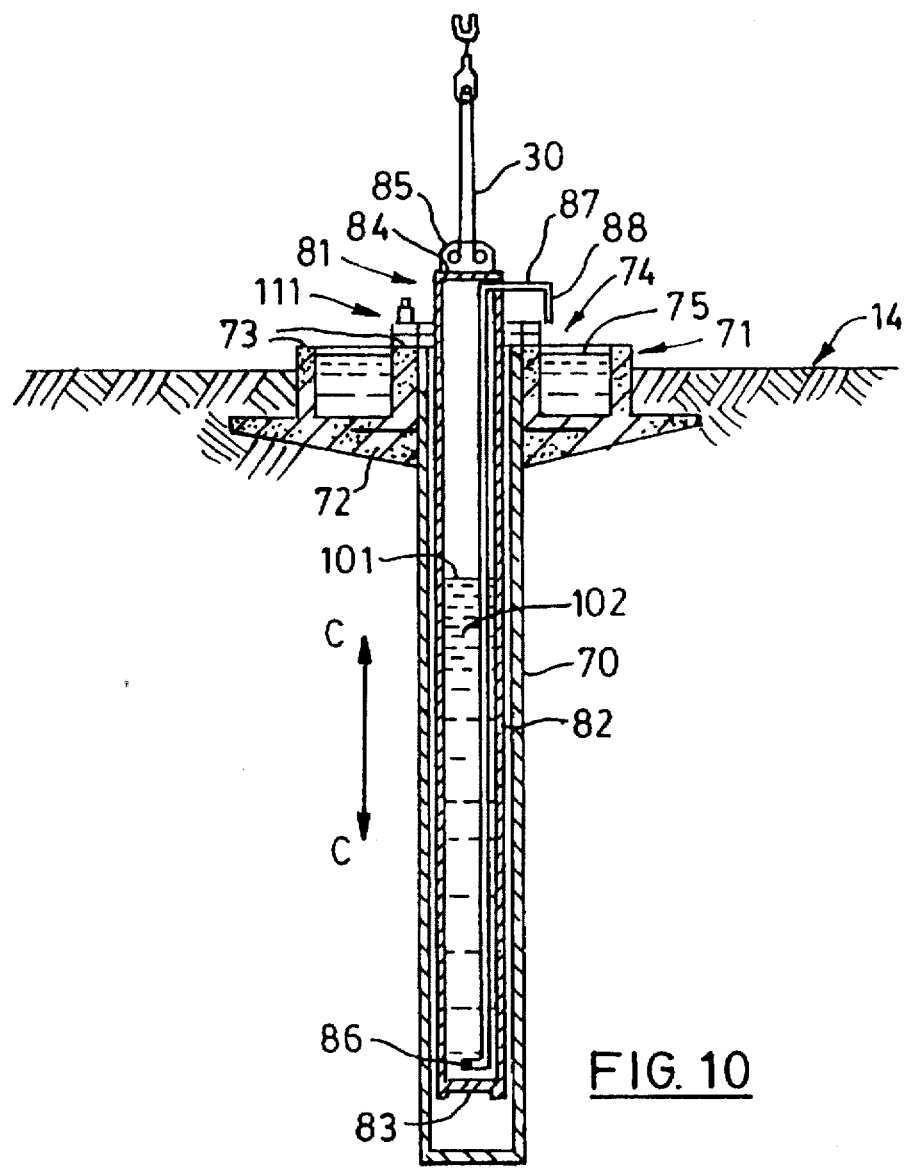
FIG. 10 is an elevation view, in cross-section, of a ballast anchor in accordance with the present invention.
Figure 11:
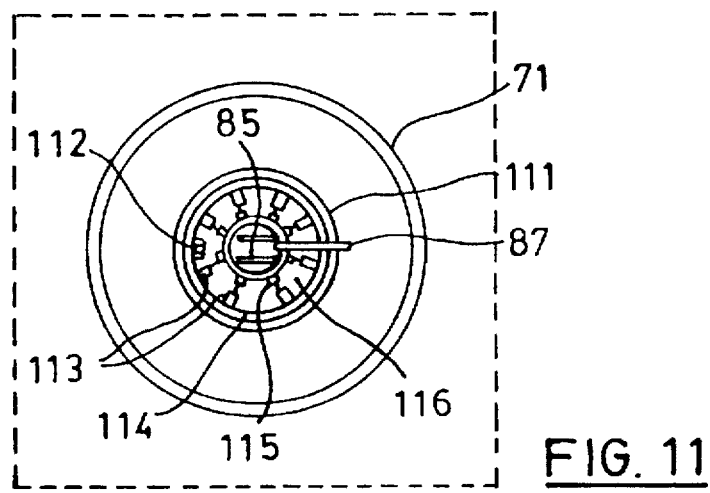
FIG. 11 is a plan view of FIG. 10.

As best seen in FIGS. 10 and 11 ballast anchor 32 is provided for vertical movement in the direction of Arrows C—C. Ballast anchor 32 includes a ballast pipe sleeve 70 mounted within reinforced concrete anchor ring 71 at ground surface 14. Preferably, pipe sleeve 70 is a steel hollow cylindrical pipe welded to reinforcements 72 within anchor ring 71. Preferably, anchor ring 71 includes ring wall portions 73, to form reservoir 74, having a water level 75. Slidably received within pipe sleeve 70 is a ballast buoy 81. Preferably, ballast buoy 81 is a cylindrical tube having the cylindrical side wall 82 and a bottom wall 83. At the top wall 84 is a tethering cable winch 85 like tethering cable winch 51, for attachment tethering cable 30. Mounted on the interior face and bottom wall 83 is reversible pump 86. A siphon tube 87 is connected to pump 86 which penetrates through top wall 84 and is bent around such that siphon tube end 88 is submerged below reservoir water level 75, when ballast buoy 81 is resting at the bottom of its stroke in ballast pipe sleeve 70.

As can been seen, reversible pump 86 may be operated in order that the level 101 of the water 102 may be changed in order to increase or decrease the ballast. It will be appreciated that sand or other flowable substance may serve as ballast with appropriate pumps or conveyors. Like fixed anchor 31, ballast anchor 32 is connected to tethering cable 30 via tethering cable winch 85.

As described, ballast anchor 32 functions as a gravitational reactive anchor which maintains pre-stress in tethering cable 30 and thus, the cables 24, 25 & 28 and the membrane sections 21. This is especially necessary during cooling of the closed hydrocycle within variable volume polydome enclosure 10 when buoyancy is reduced late in the day, as shown by the buoyancy curves in FIGS. 6A and 7A. Ballast anchors 32 allow the enclosure to expand while maintaining a moderate pneumatic pre-stress in membrane sections 21 of enclosure 10. During the heating phase of the cycle some of the solar energy is converted to gravitational potential energy by lifting the ballast during the early phase of the cycle. The energy is then released to maintain pneumatic pre-stress against decreasing buoyancy in the later phase of the daily cycle as the ballast anchors fall during cooling. Because the enclosure is allowed to expand by way of the ballast anchors during the heating phase of the cycle, water vapor can be retained for condensation during the cooling phase, as will be described hereinafter. Ballast anchors 32 allow the buoyancy of the system to oscillate in a pattern that corresponds to the oscillating difference between the energies of the ambient atmosphere and the enclosed atmosphere during the daily diurnal cycle. Obviously the magnitude of the oscillation is specific to any given system and the weight of the individual ballast anchors must be designed for a particular system in a particular climate and, as shown in FIG. 6A, 6B, 7A and 7B will vary during yearly seasonal changes. As such, the level of water 101 in ballast anchor 32 can be changed serving to change ballast weight when required for the particular season. Thus the analysis and design of enclosure 10 is for meteorological, thermodynamic, spectral and structural specifics.

In accordance with another feature of the invention, as shown in FIGS. 10 and 11, ballast anchors 32 may be locked with a hydraulic locking system 111 comprising hydraulic pump 112, hydraulic pistons 113 and a hydraulic fluid line 114 connected therebetween. When hydraulic system 111 is pressurized by pump 112 with fluid from line 114, pistons 113 extend and press locking plates 115 against side wall 82 of ballast buoy 81 so as to form an essentially continuous locking ring 116 about ballast buoy 81 in order to lock ballast anchor 32 in a fixed position. It will be appreciated that this arrangement allows ballast anchor 32 to be locked immediately at any point in the stroke C—C of the ballast buoy 81, as the need may arise, during uncommon meteorological conditions such as high winds, etc.

It will be further appreciated that hydraulic locking system 111 may be modified in many ways including a manually operated pump, or pneumatic pumps and pistons. Further, FIGS. 10 and 11 show hydraulic pump 112 designated for a specific hydraulic collar system 111. It will be appreciated that a common pump may be used for a number of ballast anchors 32 with a plurality of hydraulic fluid lines 114 extending from each pump 112. As such the hydraulic pump 112 would operate a plurality of hydraulic locking systems 111. It is further contemplated that hydraulic locking system 111 would be used during initial inflation and pressurization of pneumatic enclosure 10, or used during cloudy periods of broken diurnal rhythm or in anticipation of damaging high winds and wind harmonics, in combination with inflation fans 16 to adequately maintain and support the structure 10. In such case, structure 10 would operate as a fixed volume enclosure.

Figure 13:
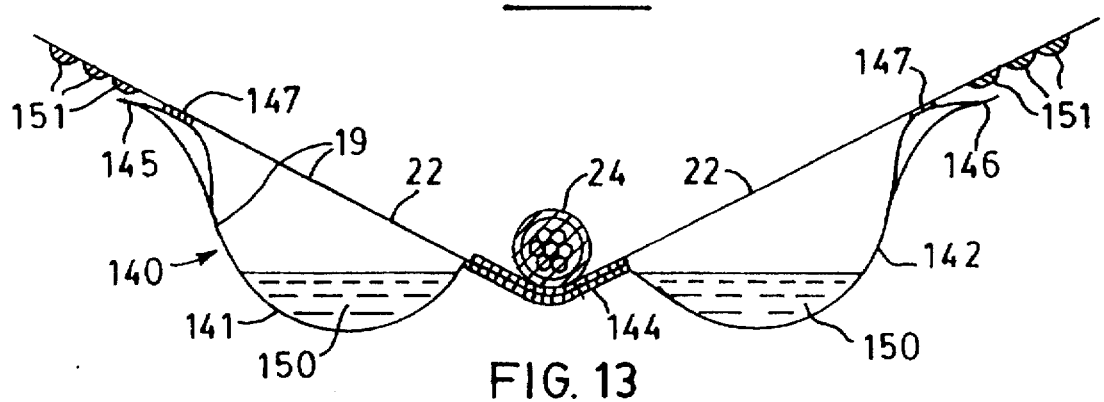
FIG. 13 is a partial elevation view taken along line 13—13 of FIG. 12.
Figure 12:
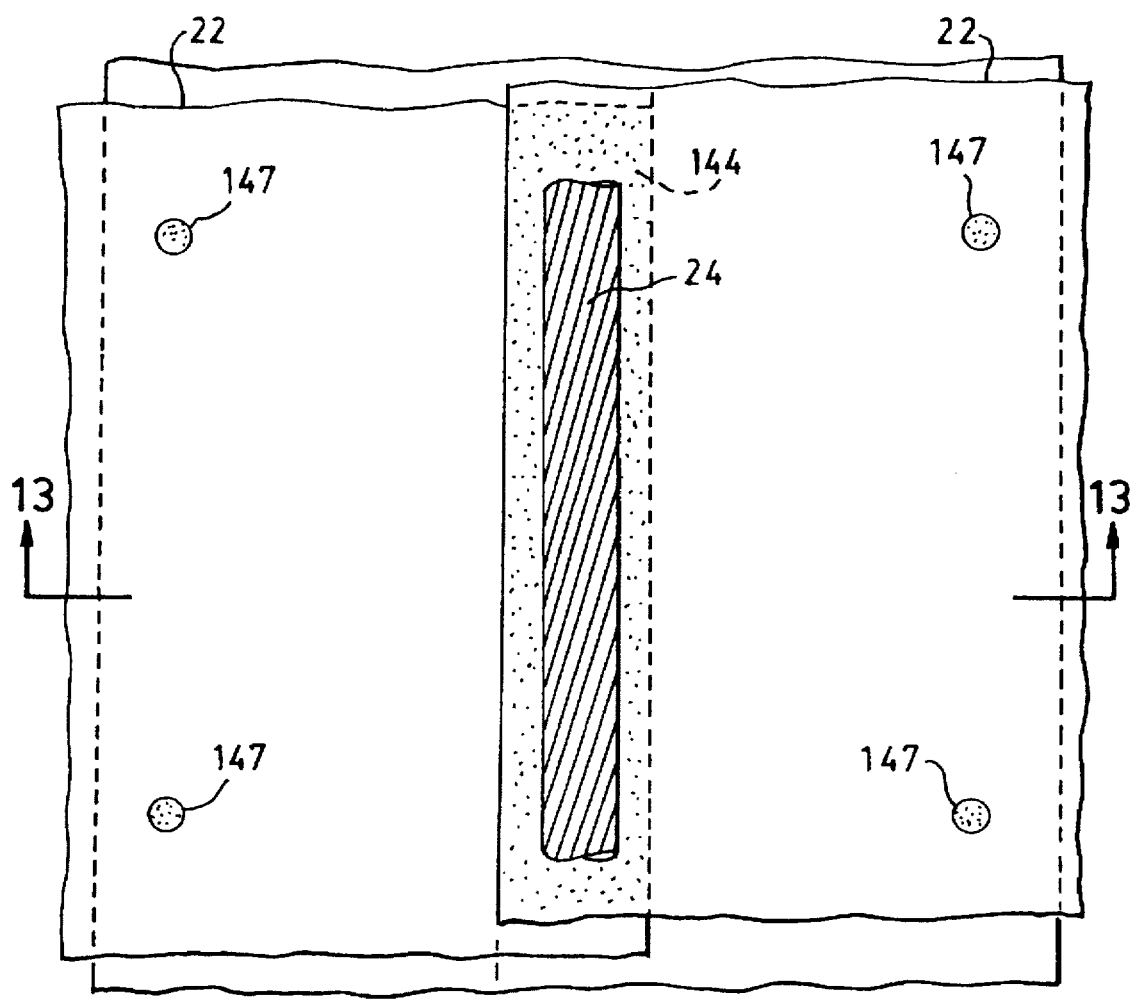
FIG. 12 is a plan detail of a seam taken from FIG. 3C showing another feature of the present invention.
Figure 15:
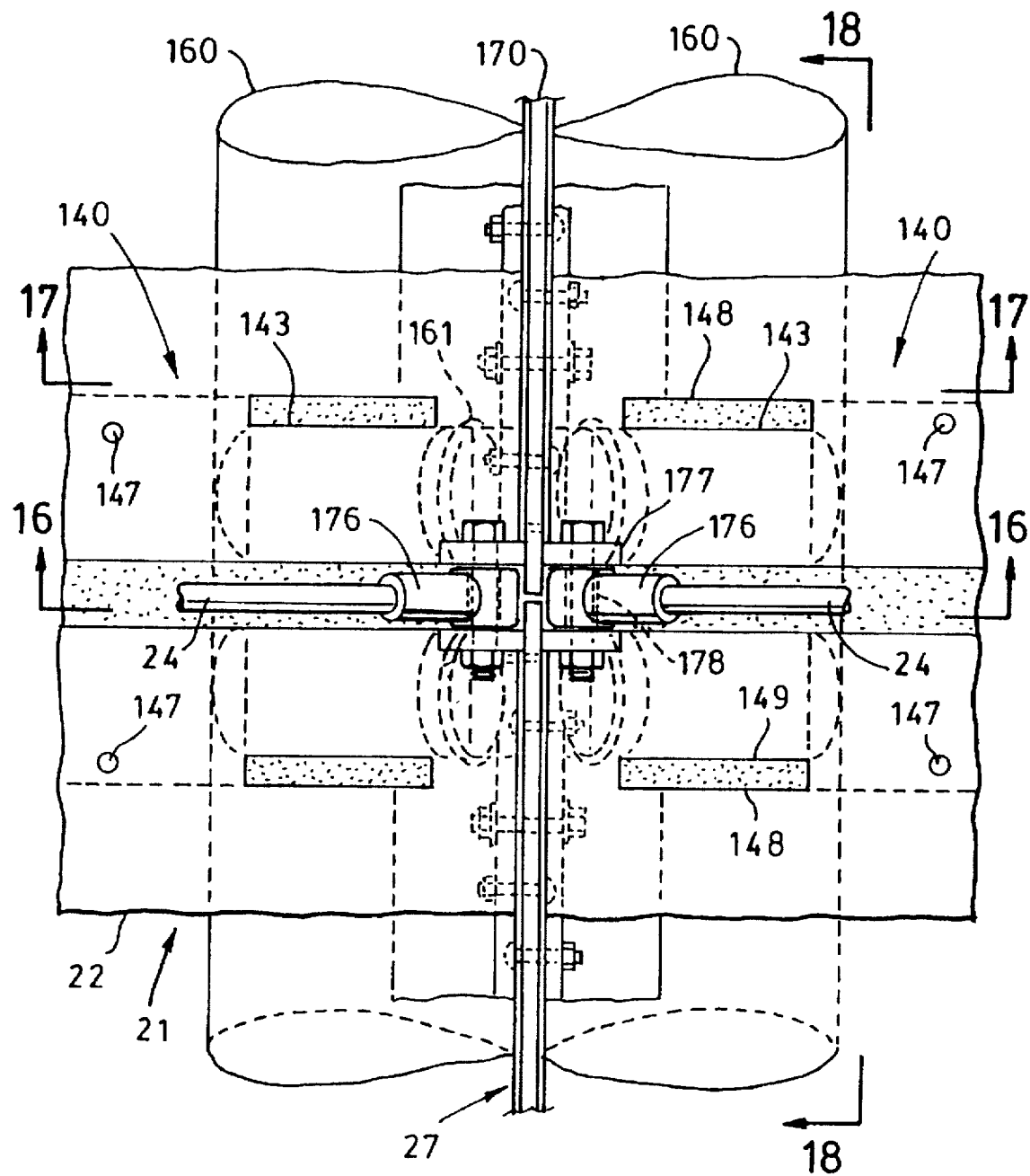
FIG. 15 is a plan detail taken from FIG. 3C showing another feature of the present invention.
Figure 16:
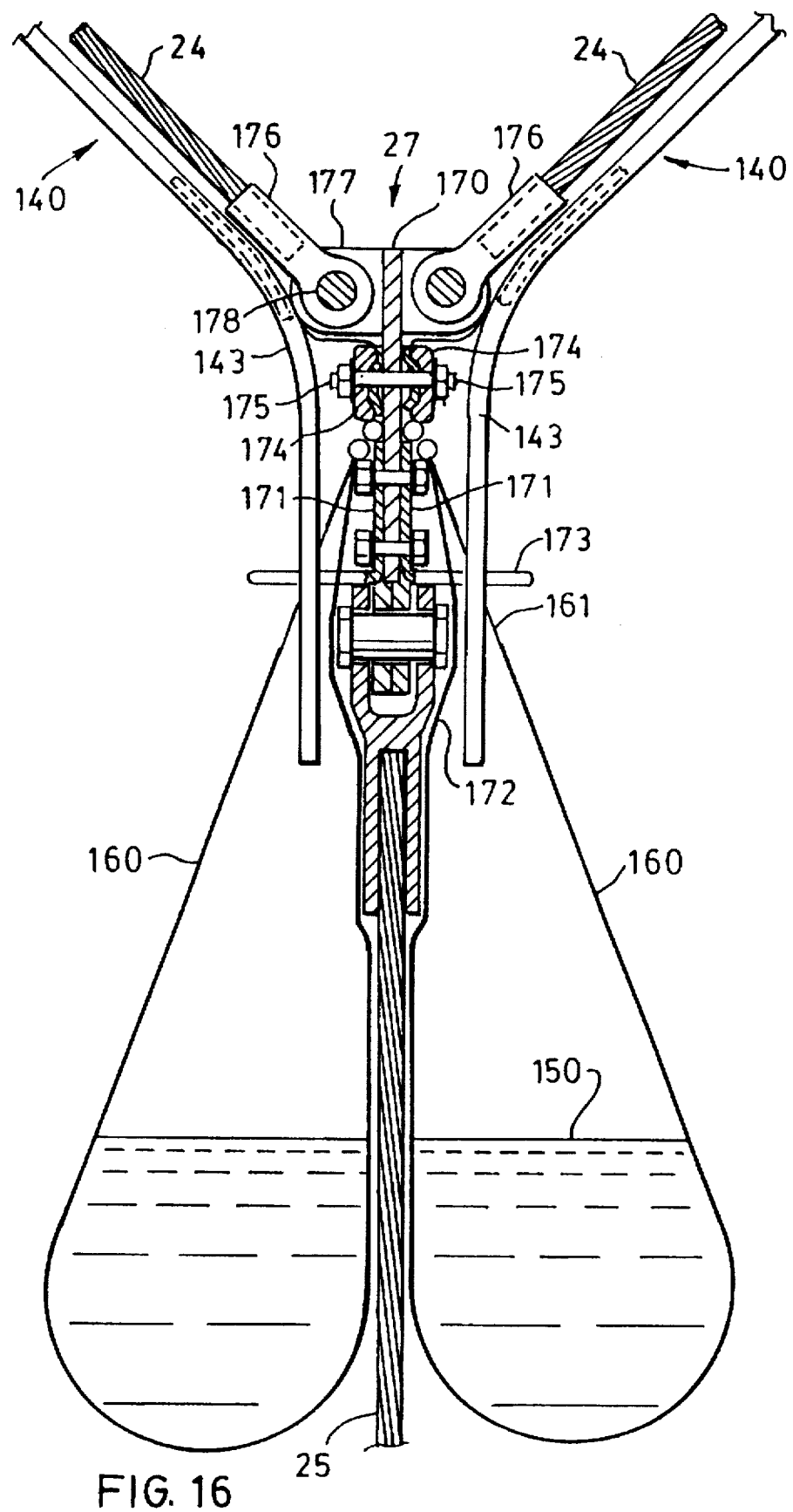
FIG. 16 is a cross-sectional elevation view taken along line 16—16 of FIG. 15.

In accordance with another feature of the invention, FIGS. 12 and 13 show a condensate collection seam 140 suspended from flexible membrane on centers with panel cables 24. Condensate collection seam 140 is comprised of two collection sections 141 and 142 adapted to collect and channel water therein. As such, condensate collection seam 140 is preferably constructed from a water impermeable flexible membrane similar to that which comprises flexible membrane 19. Condensate collection seam 140 extends in transverse direction defined by arrow A—A in FIG. 4 and, as such, is coincidental with seams between panels 22 that comprise membrane sections 21. At the center of condensate collection seam 140 is panel cable 24 which is periodically attached to a hinged connector 27, each of which is subsequently attached to cables 25, 28, connector 29, tethering cables 30 and finally attached to fixed anchors 31 or ballast anchors 32. As shown in FIGS. 12 and 13, condensate collection seam 140 is attached to flexible membrane 19 at the centerline via heat seal welded seam 144 which extends along the entire length of condensate collection seam 140 in the direction of arrow A—A. At the outer perimeter edges 145 and 146, respectively, the spot seal welds 147 hold outer perimeter edges 145 and 146 adjacent to flexible membrane 19 in order that condensate droplets 151 may flow by gravity down the curved interior surface of membrane panel 22, attached thereto by surface tension and then may be collected as condensate water 150 in collection sections 141 and 142. Each of sections 141 and 142 extend downward due to the weight of condensate water 150 and the membrane configuration as shown in FIG. 14, to form an inverted bell shaped curve.

Figure 14:
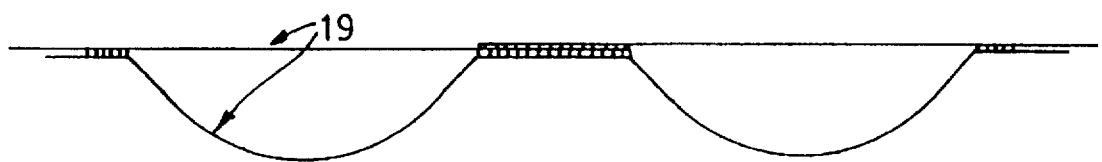
FIG. 14 is an assembly view of the detail of FIG. 13 prior to installation.

FIG. 14 shows condensate collection seam 140 as fabricated membrane only, without cable 24, as may be fabricated on heat seal equipment known in the art.

FIGS. 15–18 show details of hinge connector 27, joining membrane sections 21, panel cables 24, and arch base cables 25. These figures also illustrate the means by which the condensate collection seams 140 terminate in condensate collection tubes 143 that channel the condensate water 150 into the aqueduct reservoirs 160 which are also suspended from hinge connector 27. The individual collection sections 141 and 142 terminate with termination weld 148 replacing spot seal welds 147 such that collection sections 141 and 142 become closed wall sections 149 into which condensate collection tubes 143 may be fitted. Condensate collection tubes 143 enter aqueduct reservoir 160 via side wall hole 161. Aqueduct reservoir 160 is preferably constructed of a water impermeable membrane similar to flexible membrane 19. Condensate collection tubes 143 are preferably constructed from water impermeable membrane like flexible membrane 19 that has been preformed from sheet into tube and with the interior treated with a dissimilar material such as silica gel, such that they may be welded into closed wall sections 149, without adhering the interiors of condensate collection tubes 143 to themselves.

In accordance with another feature of the invention, hinge connector 27 joins panel cables 24, membrane sections 21, arch base cables 25 and suspends aqueduct reservoirs 160, independently of each other, in the assembly of the system. This feature is seen in FIG. 15–18 and is significant in simplifying the initial assembly of the enclosure. The continuous, segmented, central plate sections 170 are joined together by bolting with sandwich plates 171. Yoke eye termination 172, of arch base cables 25, may then be fitted and bolted to sandwich plates 171. Independently, aqueduct reservoirs 160 may be clamped to central plate sections 170 by means of clamp angle 173 using bolts. Individually, membrane sections 21 may be clamped to alternate sides of central plate section 170 by the clamp channel 174 by bolting with alternating rib neck bolts 175, thus pinching sections 21 between plate section 170 and the clamp channels 174. The closed eye terminations 176 of panel cables 24 may be fitted between welded lug plates 177 on both sides and at adjoining ends of central plate sections 170. Closed eye terminations 176 include internal collar sleeves 178a that are aligned in substantial registry with the recesses 178b in lug plates 177, sleeves 178a and recesses 178b are sized such that bolt 179 may be tightened without binding closed eye termination 176, in order that it may rotate about bolt 179. This configuration of hinge connector 27 allows for simple replacement of translucent flexible membrane 19 on a predictable life cycle basis without disruption to or disassembly of the enclosure 10 as a whole.

The entire enclosure can be re-skinned by replacing individually, continuous arched sections of membrane 19 from perimeter to opposite perimeter, i.e. all bands of membrane sections 21 joined in the direction of arrow B that lie between hinge connectors 27. The replacement membrane sections 21 are assembled with rope bead clamps 26 at or near the ground below the sections to be replaced. The assembled sections are then simultaneously hoisted on a bed of ropes from the ground with temporary winches hooked into the yoke terminations 172 of arch base cables 25, up to the general level of hinge connection 27. Then, sequential sections of clamp channel 174 may be removed from the old membrane sections 21, the membrane edges 34 or 33 removed from alternating bolts 175, the membrane edges 34 or 33 of the replacement membrane sections 21 are then placed over alternating bolts 175 with clamp channel 174 then being tightened into replacement membrane section 21. Even as the moving of the clamp channel 174 is accomplished, old membrane sections 21 are restrained by panel cables 24. Air leakage of the clamped edges is minimal due to the overlap of the old and replacement membranes 21. However, as the clamping of the replacement membrane sections 21 is complete, the leakage will allow the internal pressure of enclosure 10 to lift the replacement membrane sections 21, into the position of the old membrane sections 21. At that point, the old membrane sections 21 may be sliced at about the line of panel cables 24 and removed from the exterior of enclosure 10, in small sections, for re-processing.

In accordance with another feature of the invention, condensate water 150, collected by condensate collection seams 140 and stored in aqueduct reservoirs 160 by virtue of the height of which is collected and stored, may utilize the pressure head for hydro-electric generation as well as for the pressurization of various water distribution systems.

Figure 19:
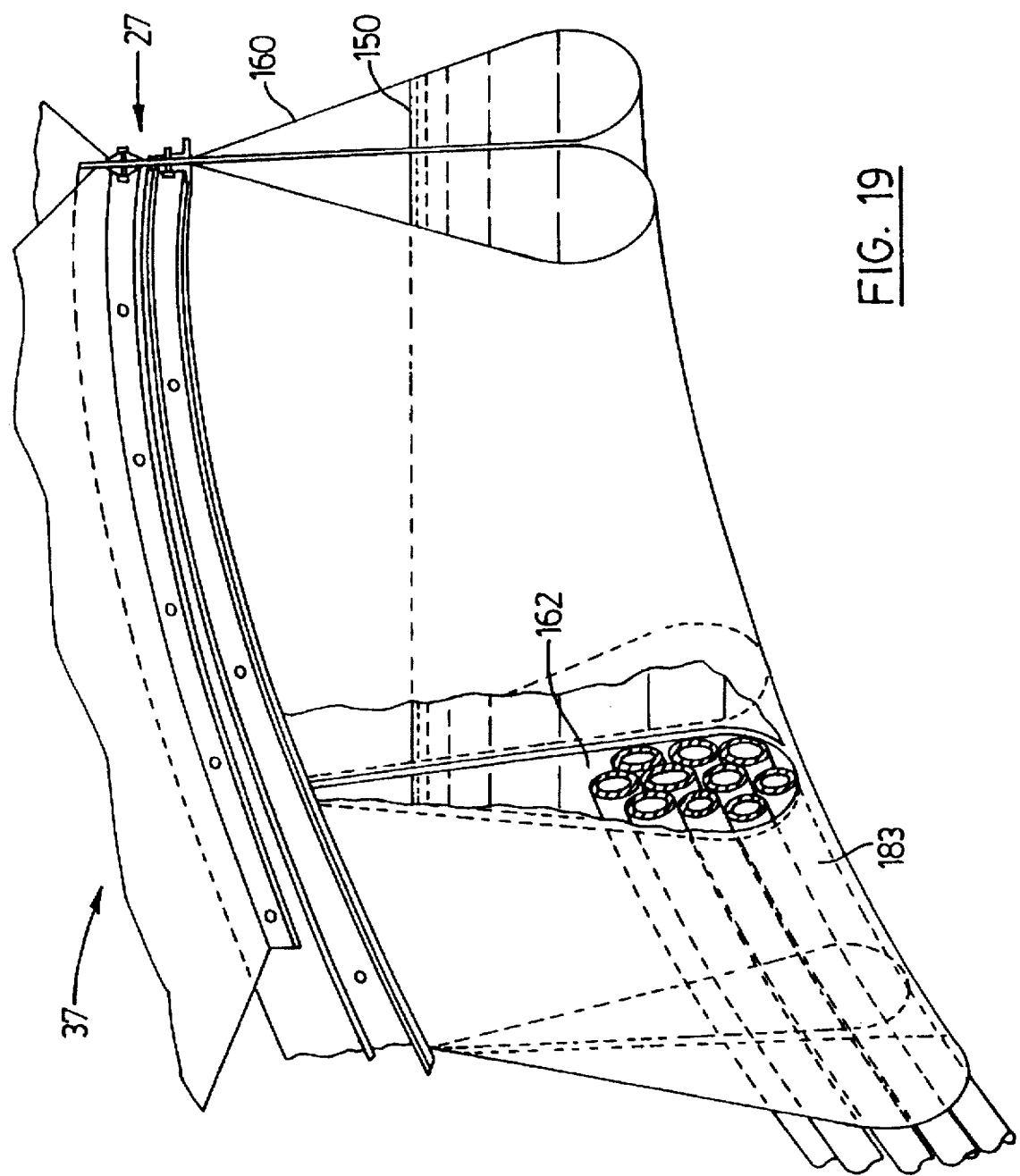
FIG. 19 is a detail pictorial view of moment resisting hinge connector, shown in FIG. 15.

Preferably, the hydro-electric system of enclosure 10 is comprised of two sub-systems. These systems are: a fixed system associated with fixed anchor lines 37; and a ballast system associated with ballast anchor lines 32. As is best shown in FIGS. 3B and 19, the fixed hydro-electric sub-system 180 drains aqueduct reservoirs 160, of fixed anchor lines 37, for electrical generation at fixed hydro-electric turbine 181 and then to pressurize infra-structural water distribution system 182. Condensate water 150 enters fixed hydro-electric sub-system 180 at manifold panel 162, located within aqueduct reservoir 160, near the top of the lower side portions 12, of enclosure 10. From manifold panel 162, condensate water descends at increasing pressure within down feed hoses 183 carried within aqueduct 160 to turbine 181. Down feed hoses 183 are designed to withstand the high pressure associated with the contained descent of condensate water 150. Descent from the height of aqueduct reservoirs 160, preferably 600 feet, to the height of the turbine 181, preferably 30 feet, results in a pressure of approximately 250 p.s.i. Hydro-electric turbine 181 and infra-structural water distribution system 182 may be designed to the various domestic, agricultural and industrial purposes of a particular installation of a given enclosure 10 by various means known in those arts.

Figure 17:
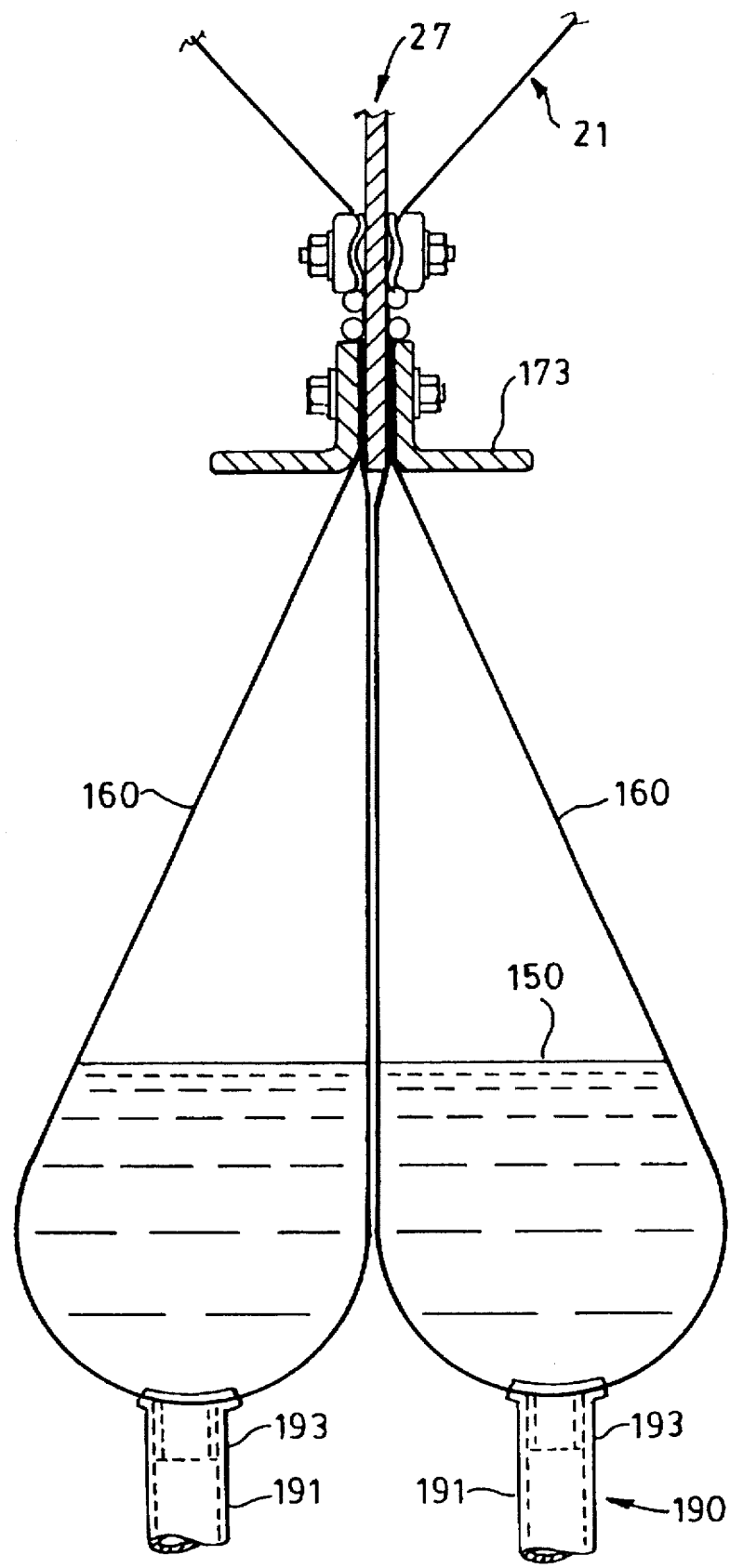
FIG. 17 is a cross-sectional elevation view taken along line 17—17 of FIG. 15.
Figure 18:
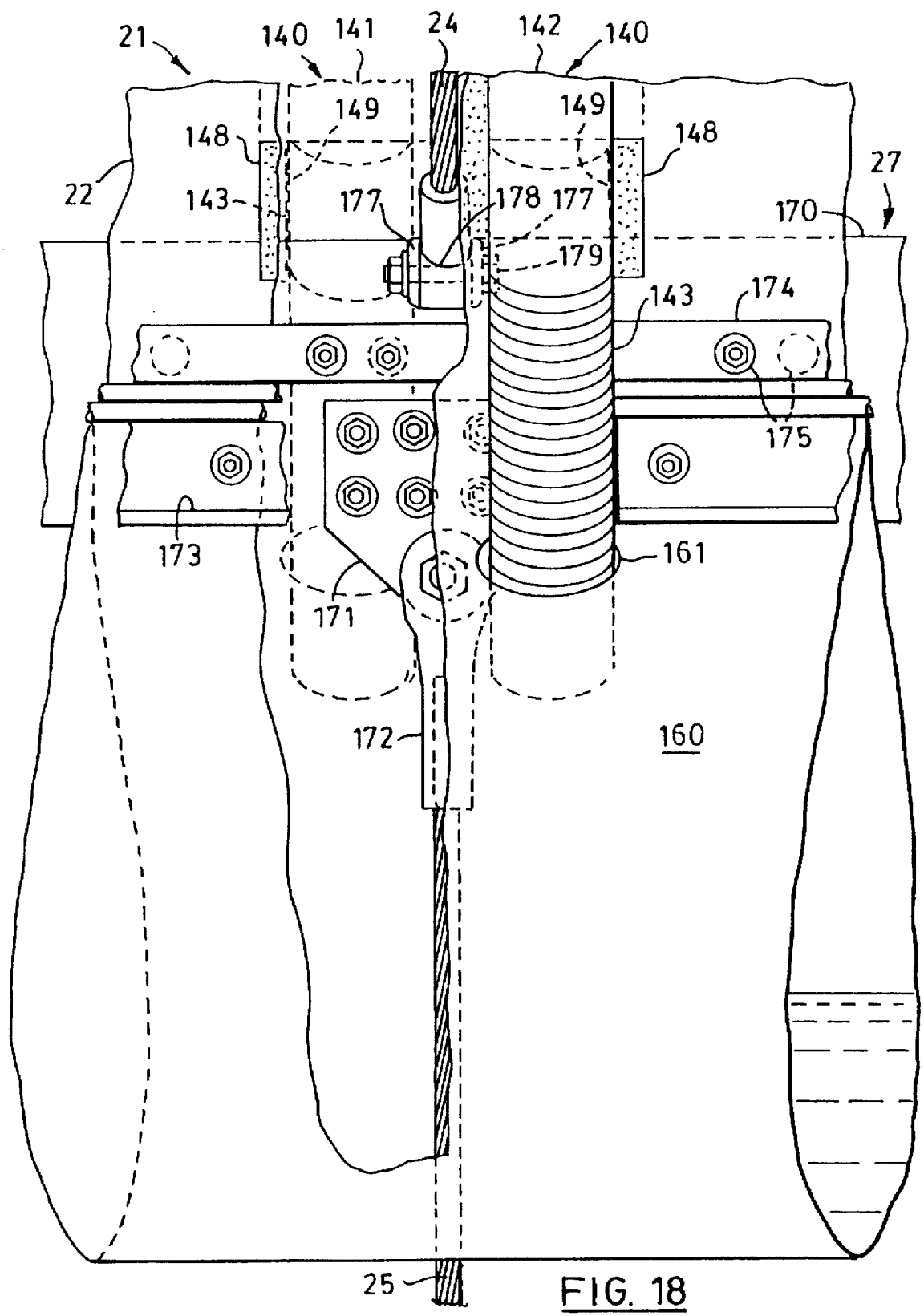
FIG. 18 is a schematic elevation view taken along line 18—18 of FIG. 15.

As is best seen in FIGS. 2A, 3A and 17, the ballast hydro-electric sub-system 190 consists of a series of sets of down feed tubes 191 that supply a corresponding series of annular hydro-electric turbine sprinklers 192 that are preferably mounted on ballast buoys 81, at alternate ballast anchors 32, along a ballast anchor line 38. Preferably, down feed tubes 191 drain aqueduct reservoirs 160 in line with the tethering cables 30 and are periodically supported by the cables as they descend to the turbine sprinklers 192. Condensate water 150 enters hydro-electric sub-system 190 at tube connectors 193, located on the bottom of aqueduct reservoirs 160, below alternate intersections of membrane sections 21, along a ballast anchor line 38. Condensate water 150 exits sub-system 190 as synthetic rain 194 from turbine sprinklers 192. Electricity thereby generated may be carried by conductors coincidental with tethering cables 30 and catenary cables 38, to connect at or about perimeter anchorage 13 with an electrical grid of non-described design, supplied as well by fixed hydro-electric turbines 181. The synthetic rain pattern 195 of the preferred embodiment is shown schematically, in plan, in FIGS. 3C and 4.

The preferred embodiment of the hydro-electric system of enclosure 10, being comprised of two sub-systems fixed sub-system 180 and ballast sub-system 190, anticipates a balanced dual utilization of the hydro-electric resources generated by the operation of enclosure 10. However, either sub-system may be employed wholly or substantially over the other as may suit the purpose of a particular installation of a given enclosure 10.

In accordance with another feature of the present invention dual anchorage system, comprised of both fixed anchors 31 and ballast anchors 32, includes means by which enclosure 10 may be assembled and anchored at or about the ground surface 14, and then elevated to its operating altitude, preferably about 600 feet. As is best shown in FIGS. 20–22, with reference also to FIGS. 8–11, enclosure 10 may be assembled as a multi-element, ground mounted, pneumatic structure by means known in that art, i.e. survey and installation of anchorage, clamping up and attachment of complete membrane canopy to anchorage, with subsequent pressurized inflation by inflation fans 16 as is shown in solid lines in FIG. 22. Then winches 50 and 51, shown in FIGS. 8 and 9, and winch 85 shown in FIGS. 10 and 11, unreel tethering cables 30 or bracing cables 41 and enclosure 10 rises controllably in the direction of arrow C—C on an increasing volume of pressurized air provided by inflation fans 16. A mid-point in this process is shown in dashed lines in FIG. 22. The process continues until enclosure 10 attains operating altitude, shown in FIG. 21. Normally, hydraulic locking system 111 at ballast anchors 32 would be active to lock ballast anchors 32 during the elevation process. As operating altitude is attained and with a sufficient charge of vapor in the enclosed atmosphere and weight in the ballast buoys 81, enclosure 10 may commence with oscillatory operation, as a variable volume pneumatic enclosure, to provide the closed hydrocycle that is the prime object of the present invention. It should be appreciated that while cyclical vaporization of water provides the primary means of internal cooling during the operation of enclosure 10, vent values 23 may be opened as needed for ventilation cooling during the assembly and elevation phases of the installation process. Inflation fans 16 must be designed to provide for this requirement. Preferably, inflation fans 16 are of backward inclined centrifugal airfoil design, as is known in the art and powered by a variable r.p.m. and variable horsepower motor, such as a natural gas fired internal combustion engine.

Enclosure 10, thus described and illustrated, contemplates a desert envitalization system where an individual enclosure can cover several square miles in an area. In such enclosures, the distance between the perimeter, where outside air enters and the most central internal point is small enough to allow for an enclosed atmosphere of substantial constant chemical constituency. However, because the enclosed atmosphere is supporting photosynthesis, thereby tending to become rich in oxygen and poor in carbon dioxide and since the source of $CO_2$ is at the perimeter, enclosures that are greatly extended so as to cover hundreds of square miles, could conceivably become starved of $CO_2$ in their central regions, inhibiting photosynthesis in those areas. In such cases, ancillary inflation and exhaust means may be provided by adapting selected vent valves 23. As is best shown in FIGS. 2A and 2B, vent valves 23, above fixed anchor points 31, may be fitted with vent valve tubes 39, connecting with ancillary fans 40, mounted at grade. Preferably, ancillary fans 40 include dampers to provide for either powered intake from the outside or powered exhaust from the enclosed atmosphere. Ancillary fans 40 are operated so as to provide for an enclosed atmosphere of substantially constant chemical constituency, capable of supporting photosynthesis throughout even greatly extended versions of enclosure 10 that may cover an essentially unrestricted area.

Additionally, it should be appreciated that because the enclosed atmosphere tends to stratify vertically with warm, moist air at the top and cool, dry air near the ground, vent valve tubes 39, alone, may be fitted generally to vent valves 23, to advantageously control the portion of the enclosed atmosphere involved in exchange with the ambient atmosphere. Specifically, if enclosure 10 is being operated on a buoyancy cycle only, without use of inflation fans 16 or ancillary fans 40, then opening vent valves 23, when vent valve tubes 39 are fitted, will result in the exhaust of only the coolest, driest air from enclosure 10 at the end of the cooling cycle (described previously for FIG. 5A). Similarly, use of vent valve tubes 39 allow vent valves 23 to be open during the most buoyant part of the heating phase of the cycle and thereby function like inlet dampers 17 (described previously for FIG. 5C). This is because the warmest, lightest, most buoyant air of the enclosed atmosphere remains captive in the upper parts of enclosure 10 to provide lift, while the intake of outside air is accomplished near the ground surface 14, at the bottom end of vent valve tubes 39.

Thus described, a single enclosure 10 of unrestricted size, may be operated on a buoyancy cycle only, when properly designed, as well as with the ongoing assistance of inflation fans 16 and ancillary fans 40.

The invention has been described with reference to preferred embodiments. Obviously, modifications and alterations will occur to others upon reading and understanding this specification. It is intended to include all such modifications and alterations insofar as they come within the scope of the invention.

What is claimed is:

1. A variable volume enclosure for anchoring to the ground, said enclosure comprising:
   (a) a plurality of membrane panels;
   (b) a reinforcement system for interconnecting said membrane panels;
   (c) anchor means coupled to said reinforcement system for affixing to the ground;
   (d) said anchor means including ballast anchors having means for allowing movement of said reinforcement system in response to pressure changes in the enclosure to vary the volume of the enclosure.

2. The variable volume enclosure as claimed in claim 1, wherein said anchor means include fixed anchors and said reinforcement system includes first and second tethering cables, said first tethering cables being coupled to said ballast anchors and said second tethering cables being connected to said fixed anchor means, and said means for allowing movement being connected to said first tethering cables and allowing said tethering cables to rise and fall in response to pressure changes in the enclosure.

3. The variable volume enclosure as claimed in claim 2, wherein said ballast anchors are alternately disposed between said fixed anchors.

4. The variable volume enclosure as claimed in claim 2, wherein said means for allowing said first tethering cables to rise and fall comprises a ballast buoy and a ballast sleeve for slidably retaining said ballast buoy therein.

5. The variable volume enclosure as claimed in claim 4, wherein said ballast buoy includes a receptacle for receiving a ballast for varying the weight of said ballast buoy.

6. The variable volume enclosure as claimed in claim 1, further including water supply means for supplying water to the enclosure from an external source.

7. The variable volume enclosure as claimed in claim 6, further including evaporator means for evaporating water inside the enclosure, said water being supplied by said water supply means.

8. The variable volume enclosure as claimed in claim 7, wherein a portion of said evaporated water provides a means for leeching ground soil contained in the enclosure.

9. The variable volume enclosure as claimed in claim 7, wherein said water supply means is connected to an impure water source.

10. The variable volume enclosure as claimed in claim 1, further including collector means for collecting condensed water within the enclosure.

11. The variable volume enclosure as claimed in claim 10, wherein said collector means include an aqueduct depending from said membrane panels for transporting said condensed water away from said panels.

12. The variable volume enclosure as claimed in claim 11, wherein said collector means include a reservoir for receiving condensed water from said aqueduct.

13. The variable volume enclosure as claimed in claim 12, further including a turbine and a feed tube connected to said reservoir for producing a flow of condensed water to said turbine for discharging said condensed water at a lower energy state.

14. The variable volume enclosure as claimed in claim 13, further including a generator coupled to said turbine for generating electrical energy from said flow of condensed water through said feed tube.

15. The variable volume enclosure as claimed in claim 2, wherein said ballast anchors include means for locking said ballast anchors in a fixed position.

16. The variable volume enclosure as claimed in claim 2, wherein said ballast anchors and said fixed anchors include winch means operative with said reinforcement system for hoisting said membrane panels to an operating altitude in cooperation with pressurized air, said pressurized air being provided by a plurality of inflation fans.

17. The variable volume enclosure as claimed in claim 1, wherein said reinforcement system includes a moment resisting hinge comprising, (a) a plate section having at least one clamping channel for receiving a portion of a membrane panel;

(b) clamping means for clamping said membrane panel in said clamping channel;

(c) means for rotatably attaching cables to said plate section, said cables providing means for securing said panels.

18. A method for irrigating soil in portions of arid regions, said method comprising the steps of:

(a) providing a variable volume enclosure;

(b) providing an initial water supply inside said enclosure;

(c) capturing said initial water supply within said enclosure caused by evaporation inside said enclosure and transpiration from plants located inside said enclosure;

(d) distributing said captured water within said enclosure as irrigation water.

19. The method as claimed in claim 18, further including the steps of providing purified irrigation water and leaching the soil to desalinate previously irrigated regions.

20. The method as claimed in claim 18, further including the steps of providing a plurality of plants within said enclosure and reducing carbon dioxide content within said enclosure.

21. The method as claimed in claim 18, further including the step of using exhaust means for reducing carbon dioxide content within the ambient atmosphere.

22. The method as claimed in claim 18, further including the step of prestressing said variable volume enclosure to maintain said enclosure in an inflated position.

23. A variable volume pneumatic enclosure comprising:

(a) a flexible membrane forming a surface perimeter of the enclosure;

(b) prestressed reinforcing means connected to said flexible membrane for supporting the enclosure;

(c) means for anchoring the enclosure, said means for anchoring including ballast anchor means connected to said prestressed reinforcing means;

(d) means for collecting condensed water within said enclosure; and (e) means for generating electrical power from distributing said condensed water vapour.

24. The variable volume pneumatic enclosure as claimed in claim 23, wherein said anchoring means includes fixed anchors, and said ballast anchor means being alternately disposed between said fixed anchors.

25. The variable volume pneumatic enclosure as claimed in claim 23, wherein said flexible membrane is substantially impervious to water.

26. The variable volume pneumatic enclosure as claimed in claim 25, wherein said means for collecting condensed water vapour includes aqueduct means depending from said flexible membrane for transporting said condensed water away from said flexible membrane.

27. The variable volume enclosure as claimed in claim 1, wherein said membrane panels are connected to form a polydome enclosure.

28. The variable volume enclosure as claimed in claim 1, wherein said membrane panels are substantially impervious to water.

* * * * *